United States Patent
Miki et al.

(10) Patent No.: US 11,662,433 B2
(45) Date of Patent: May 30, 2023

(54) DISTANCE MEASURING APPARATUS, RECOGNIZING APPARATUS, AND DISTANCE MEASURING METHOD

(71) Applicant: DENSO CORPORATION, Kariya (JP)

(72) Inventors: Sakito Miki, Kariya (JP); Toshiaki Nagai, Kariya (JP)

(73) Assignee: DENSO CORPORATION, Kariya (JP)

( * ) Notice: Subject to any disclaimer, the term of this patent is extended or adjusted under 35 U.S.C. 154(b) by 1196 days.

(21) Appl. No.: 16/227,363

(22) Filed: Dec. 20, 2018

(65) Prior Publication Data

US 2019/0195991 A1 Jun. 27, 2019

(30) Foreign Application Priority Data

Dec. 22, 2017 (JP) .............................. JP2017-246524
Nov. 1, 2018 (JP) .............................. JP2018-206757

(51) Int. Cl.
| | |
|---|---|
| *G01S 7/481* | (2006.01) |
| *G01S 7/48* | (2006.01) |
| *G01S 17/42* | (2006.01) |
| *G01S 7/4911* | (2020.01) |
| *G01S 17/89* | (2020.01) |

(Continued)

(52) U.S. Cl.
CPC .......... *G01S 7/4815* (2013.01); *G01S 7/4808* (2013.01); *G01S 7/4911* (2013.01); *G01S 7/4918* (2013.01); *G01S 17/42* (2013.01); *G01S 17/89* (2013.01); *G01S 17/931* (2020.01)

(58) Field of Classification Search
CPC ........ G01S 17/42; G01S 17/89; G01S 17/931; G01S 7/4808; G01S 7/4815; G01S 7/4911; G01S 7/4918
See application file for complete search history.

(56) References Cited

U.S. PATENT DOCUMENTS

| | | | |
|---|---|---|---|
| 6,448,572 B1 * | 9/2002 | Tennant ................ | G01S 17/894 250/559.38 |
| 2012/0038903 A1 * | 2/2012 | Weimer .................. | G01C 3/08 250/208.2 |

(Continued)

FOREIGN PATENT DOCUMENTS

| | | |
|---|---|---|
| EP | 3006957 A1 | 4/2016 |
| JP | 2005-229253 A | 8/2005 |

(Continued)

*Primary Examiner* — Mohammed S Rahaman
(74) *Attorney, Agent, or Firm* — Maschoff Brennan

(57) ABSTRACT

In a distance measuring apparatus, an irradiating unit irradiates a measurement region with a pattern light comprised of first and second luminous patterns. The second luminous pattern has a relatively low intensity lower than the intensity of the first luminous pattern. A light receiving sensor receives, for each pixel, a return light component based on reflection of the pattern light by a target object. A measurement controller determines whether an intensity of each return light component received by the corresponding pixel satisfies a measurement condition, and obtains, as effective distance information, at least one distance value of at least one pixel of the light receiving sensor when it is determined that the intensity of the return light component received by the at least one pixel satisfies the measurement condition.

13 Claims, 19 Drawing Sheets

(51) Int. Cl.
*G01S 7/4912* (2020.01)
*G01S 17/931* (2020.01)

(56) References Cited

U.S. PATENT DOCUMENTS

| | | | |
|---|---|---|---|
| 2015/0229907 A1* | 8/2015 | Bridges | G01B 11/2513 348/46 |
| 2015/0241564 A1* | 8/2015 | Takano | G01S 7/484 356/5.01 |
| 2015/0331107 A1 | 11/2015 | Galera et al. | |
| 2017/0269197 A1* | 9/2017 | Hall | G01S 17/89 |
| 2017/0307758 A1 | 10/2017 | Pei et al. | |
| 2018/0038944 A1* | 2/2018 | Hellmig | G01S 17/894 |
| 2018/0052231 A1* | 2/2018 | Cho | G01S 7/4918 |

FOREIGN PATENT DOCUMENTS

| | | |
|---|---|---|
| JP | 2012-225807 A | 11/2012 |
| JP | 2016-166814 A | 9/2016 |
| WO | 2016/131658 A1 | 8/2016 |

\* cited by examiner

- ● : STRONG LUMINOUS PATTERN (DOTS)
- ━ : STRONG LUMINOUS PATTERN (STRIPES)
- ▨ : WEAK LUMINOUS PATTERN (UNIFORM LIGHT COMPONENTS)

FIG.3
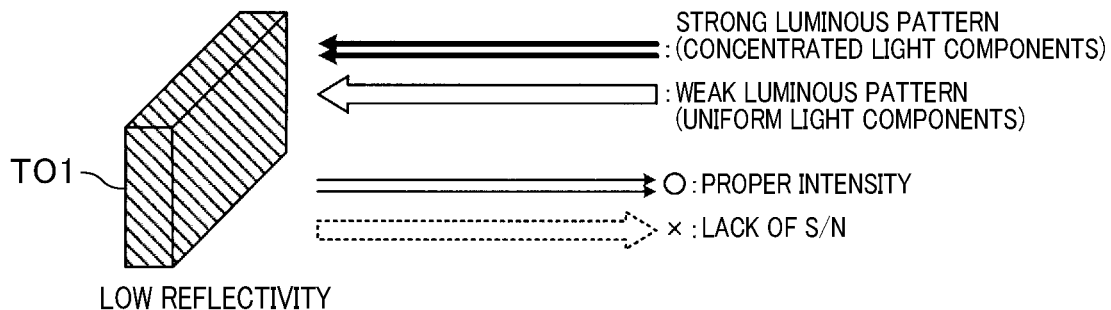
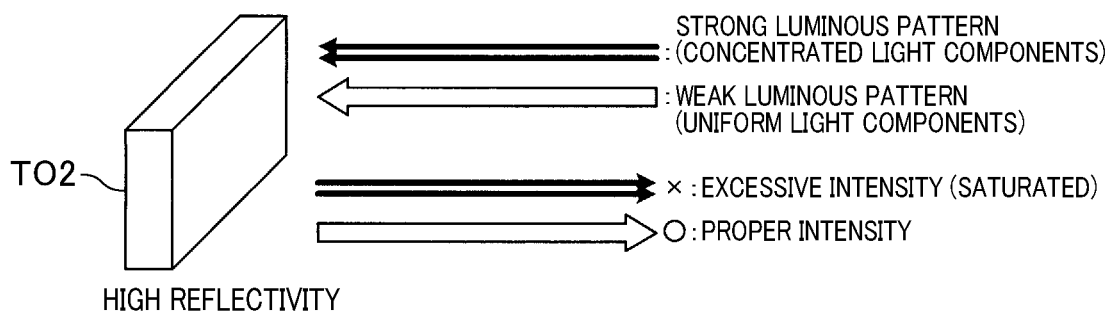
FIG.4
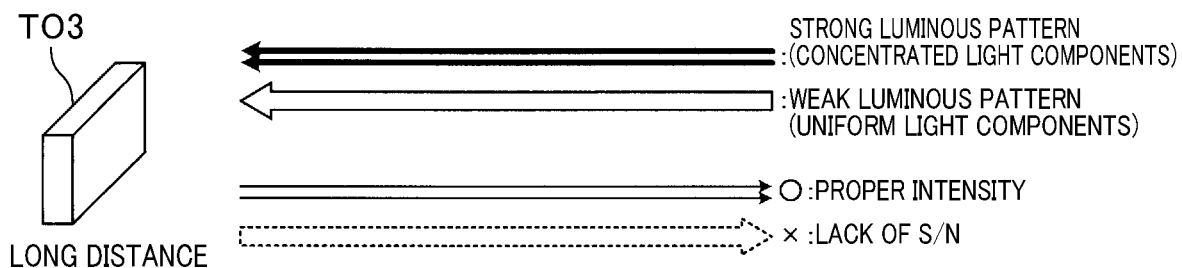
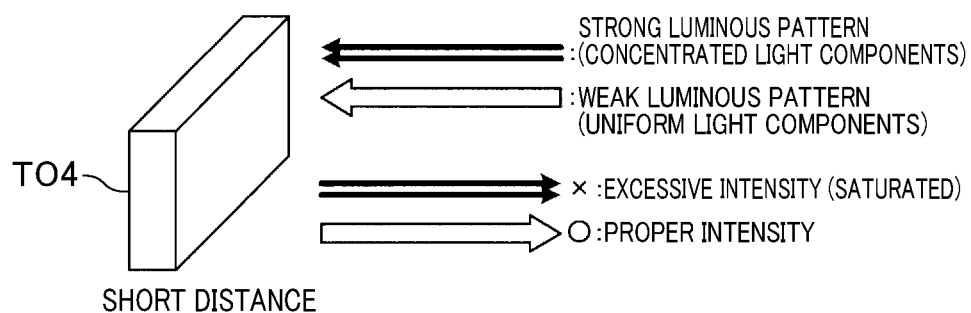

FIG.5
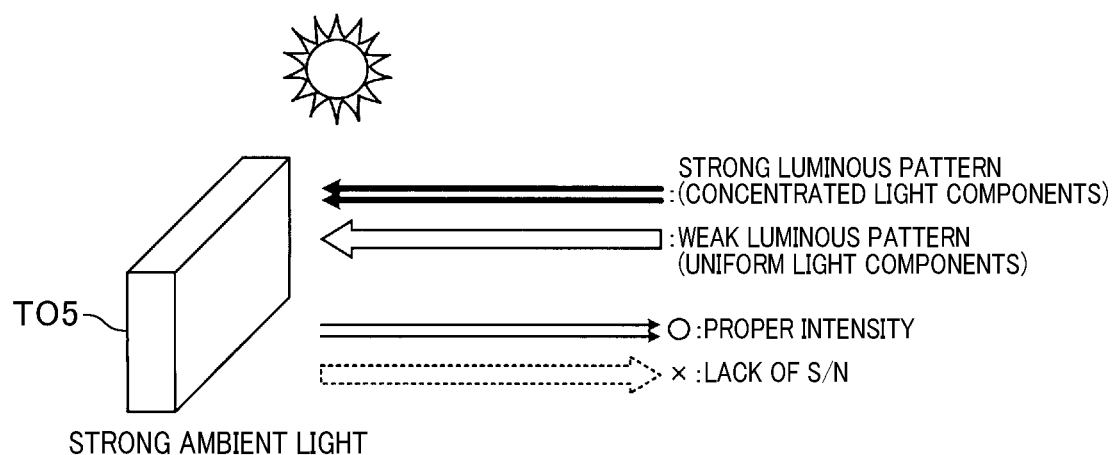
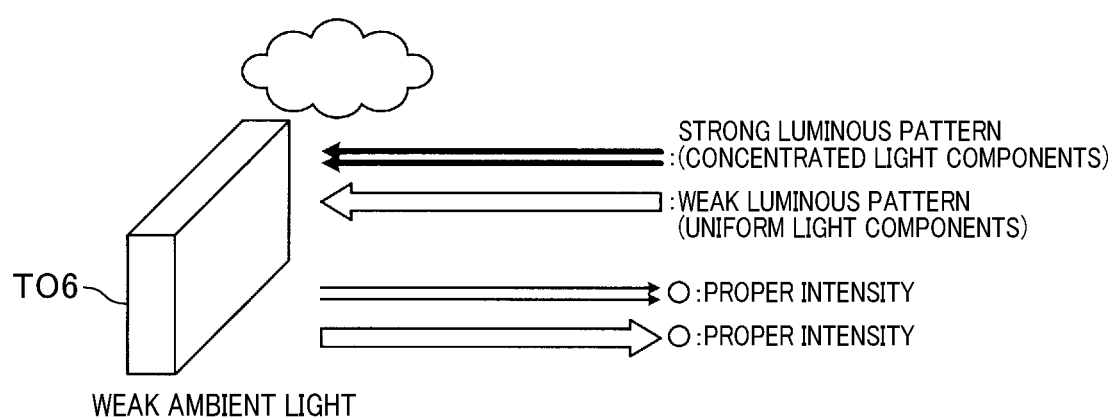

FIG.11
TARGET OBJECT
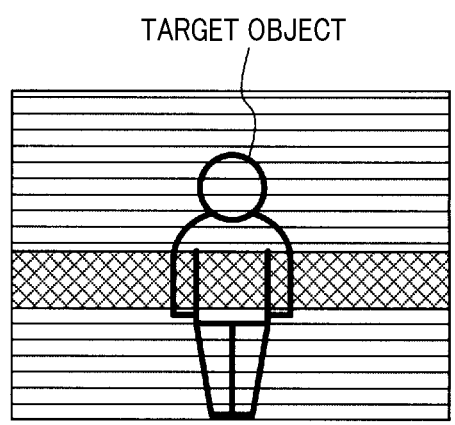
 : STRONG LUMINOUS PATTERN
(CONCENTRATED LIGHT COMPONENTS)
 : WEAK LUMINOUS PATTERN
(UNIFORM LIGHT COMPONENTS)

FIG.17
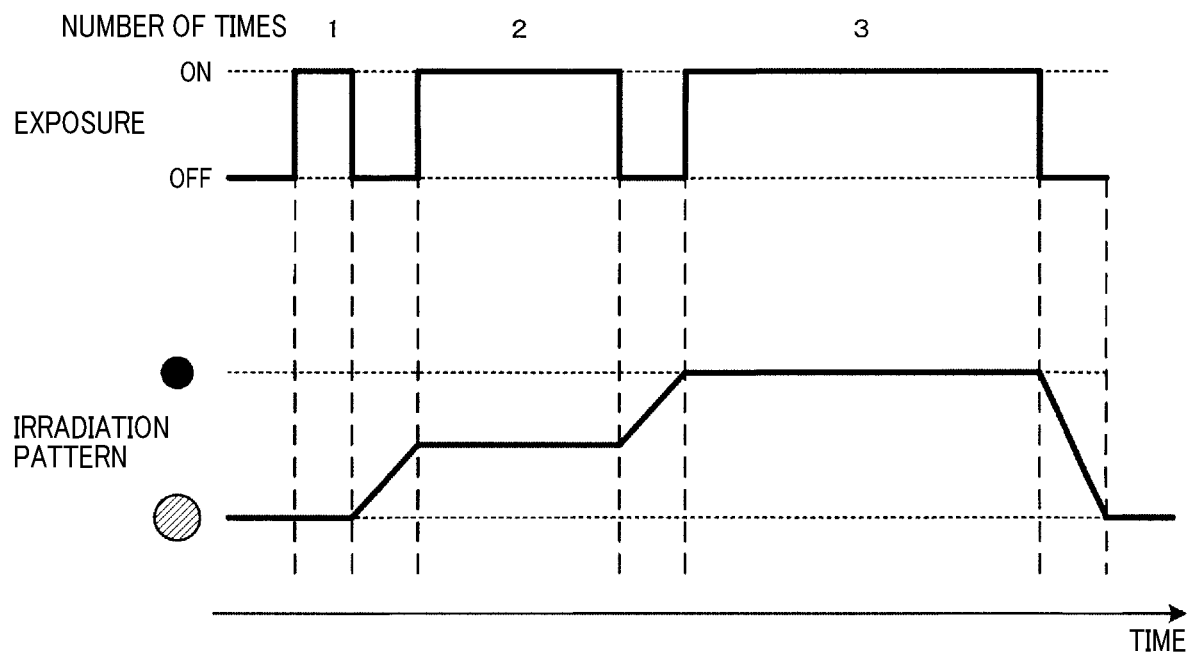
● : DIVERGENCE ANGLE: SMALL (DOT-SHAPED LIGHT COMPONENT)
◐ : DIVERGENCE ANGLE: LARGE (UNIFORM LIGHT)
<EXAMPLE OF IRRADIATION PATTERN>
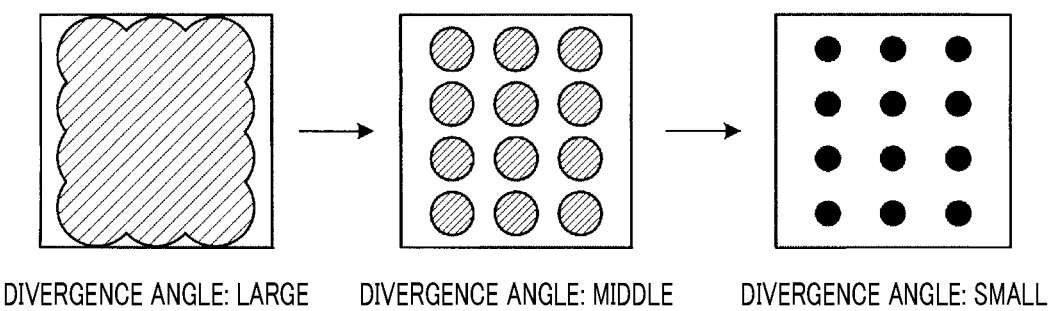

FIG.21
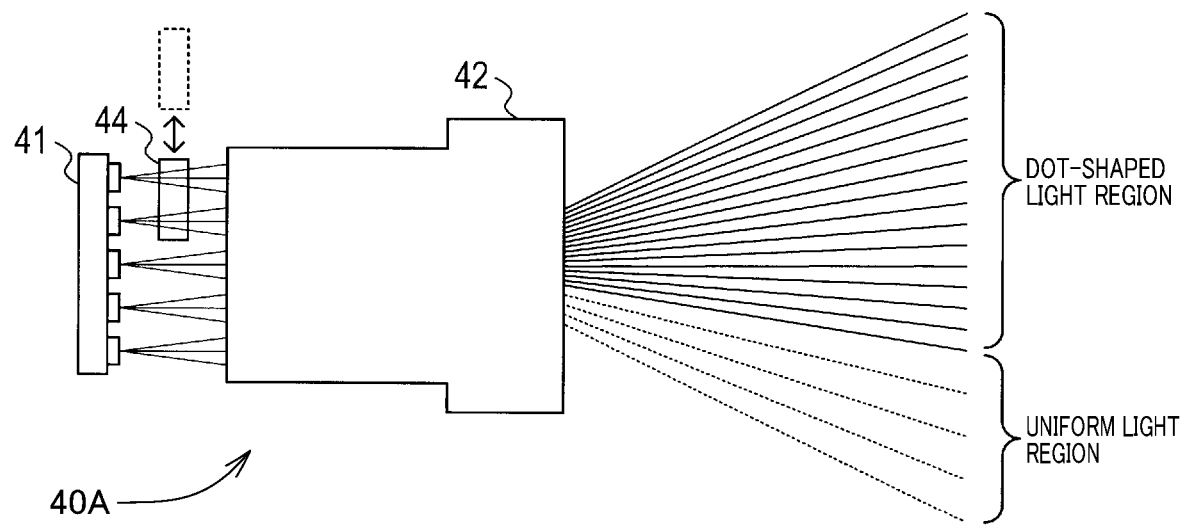
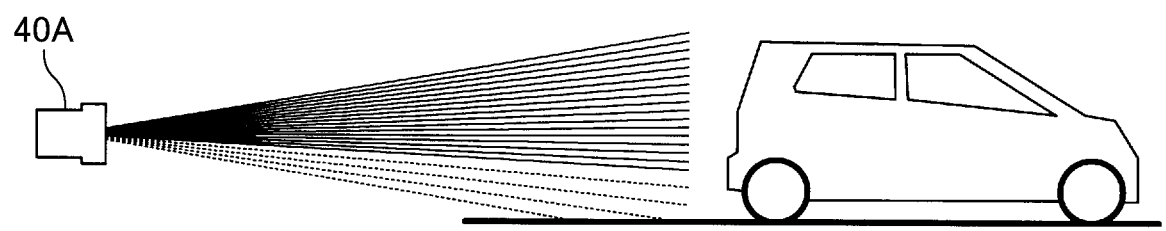

DISTANCE MEASURING APPARATUS, RECOGNIZING APPARATUS, AND DISTANCE MEASURING METHOD

CROSS REFERENCE TO RELATED APPLICATIONS

This application is based on and claims the benefit of priority from Japanese Patent Application 2017-246524 filed on Dec. 22, 2017 and from Japanese Patent Application 2018-206757 filed on Nov. 1, 2018, and the disclosure of each of these applications is incorporated in its entirety herein by reference.

TECHNICAL FIELD

The present disclosure relates to a distance measuring apparatus configured to
(1) Detect time of flight (TOF) during which light irradiated from a light source is propagated to a target object and, after being reflected by the target object, back to the distance measuring apparatus
(2) Measure a distance, i.e. a distance, of the target object relative to the distance measuring apparatus

BACKGROUND

There are known distance measurement methods that measure time of flight (TOF) during which light irradiated from a light source is propagated to a target object and, after being reflected by the target object, back to, for example, a light receiving device. Then, the distance measurement methods measure, based on the measured TOF, a distance of the target object relative to the light receiving device.

Such distance measurement methods, which will be referred to as TOF methods, include a pulse measurement TOF method that directly measures a TOF during which a light pulse irradiated from a light source is propagated to a target object and, after being reflected by the target object, back to, for example, a light receiving device.

Such TOF methods also include a phase-difference measurement TOF method that measures a phase difference between continuous illumination light, whose intensity is modulated by a high frequency signal, irradiated to a target object, and return light reflected from the target object.

The phase-difference measurement TOF method requires a high S/N ratio of the return light to achieve high-accuracy distance measurement, because the temporal resolution of the phase difference depends on the S/N ratio of the return light. In the pulse measurement TOF method, saturation of the light receiving device may make it difficult to identify a peak of a reflected light pulse, resulting in lower-accuracy distance measurement. In the pulse measurement TOF method, a lack of the S/N ratio of the reflected pulse may make it difficult to measure the distance of the target object accurately.

For example, such a TOF method is often used by an in-vehicle device. If the in-vehicle device uses the TOF method outdoors, there are many situations in each of which irradiated light is relatively weak due to strong disturbance light, so that the S/N ratio of return light may be insufficient. In addition, it is assumed that the in-vehicle device uses the TOF method in a situation in which there are various objects having remarkably different light reflectivities and/or having different distances relative to an own vehicle in which the in-vehicle device is installed.

In such a situation, the TOF method may not accurately measure the distance of at least one of the various objects relative to the own vehicle, because
(1) The reflected light or pulse may be too weak resulting in the S/N ratio of the reflected light or pulse becoming insufficient for accurate measurement of the distance of the at least one of the various objects, or
(2) The reflected light or pulse may be too strong and cause the light receiving device to become saturated, resulting in difficulty of accurate measurement of the distance of the at least one of the various objects Japanese Patent Application Publication No. 2016-166814 discloses an optical measurement device that irradiates, onto a target object, a light pattern. The light pattern is comprised of light irradiating portions, in each of which a single type of light from a light source is concentrated, and light non-irradiating portions filling the respective spaces between the light irradiating portions. Then, the optical measurement device receives return light based on reflection of the light irradiating portions of the light pattern from the target object. That is, the optical measurement device obtains distance information items about the target object based on reflection of the light irradiating portions from the target object.

This makes it possible to measure, based on the distance information about the target object, the distance of the target relative to the optical measurement device.

SUMMARY

The optical measurement device disclosed in the published patent document concentrates light to each of the light irradiating portions to thereby measure the distance of a target object while having a higher S/N ratio of the returned light.

However, the inventors of the present application have examined the optical measurement device, and, as a result of the examination, have found the following problems in the optical measurement device.

For example, the optical measurement device cannot obtain, from each of the light non-irradiating portions, a distance information item about the target object, resulting in lower resolution of a distance image; the distance image represents two-dimensional distribution of the distance information items.

In addition, because the optical measurement device obtains the distance information items using only a single type of light, it may be difficult to irradiate light having an intensity suitable for each of various target objects that have different light reflectivities and/or have different distances relative to the optical measurement device. This may result in insufficient S/N ratio of return light from each of specific target objects or in saturation of the light receiving device, making it difficult to measure the distance of each specific target object accurately.

In view of the circumstances set forth above, a first aspect of the present disclosure seeks to provide technologies, each of which is capable of addressing at least one of the problems set forth above.

Specifically, a second aspect of the present disclosure aims to provide such technologies, each of which is capable of measuring a distance of a target object with higher accuracy.

According to a first exemplary aspect of the present disclosure, there is provided a distance measuring apparatus. The distance measuring apparatus includes an irradiation unit configured to irradiate a measurement region with a pattern light having a predetermined luminous pattern, and a light receiving sensor comprising a plurality of light receiving elements respectively corresponding to a plurality of pixels, and configured to receive, for each of the pixels, a return light component based on reflection of the pattern light by a target object located in the measurement region. The distance measuring apparatus includes a measurement controller configured to obtain, based on the return light component received by each of the pixels of the light receiving sensor, a distance information item representing a distance value of the target object relative to the distance measuring apparatus for each of the pixels.

The irradiating unit includes a first light source configured to emit a first luminous pattern, and a second light source configured to emit a second luminous pattern having a relatively low intensity lower than the intensity of the first luminous pattern. The irradiating unit is configured to irradiate the measurement region with the pattern light comprised of at least one of the first luminous pattern and the second luminous pattern. The measurement controller is configured to determine whether an intensity of each of the return light components received by the corresponding one of the pixels satisfies a predetermined measurement condition, and obtain, as effective distance information, at least one distance value of at least one pixel of the light receiving sensor when it is determined that the intensity of the return light component received by the at least one pixel satisfies the predetermined measurement condition.

This configuration of the apparatus according to the first exemplary aspect makes it possible to properly obtain the distance information item of each of the target objects for each pixel of the light receiving sensor even if the target objects having different reflectivities and different distances relative to the apparatus are located in the measurement region.

For example, for a target object with a long distance relative to the apparatus or a low reflectivity, the apparatus makes it possible to accurately obtain, from return light based on the first luminous pattern, distance information about the target object while ensuring a sufficient S/N ratio of the return light, even if it is difficult to accurately obtain, from return light based on the second luminous pattern, distance information about the target object due to the lack of the S/N ratio of the return light based on the second luminous pattern.

In contrast, for a target object with a short distance relative to the apparatus or a high reflectivity, the apparatus makes it possible to accurately obtain, from the return light based on the second luminous pattern, distance information about the target object while preventing each pixel of the light receiving sensor from being saturated, even if the return light based on the first luminous pattern from the target object has an excessively high intensity.

Accordingly, even in a scene or situation where there are target objects respectively located at a long distance and a short distance relative to the apparatus 1 and/or target objects respectively having a high reflectivity and a low reflectivity, this configuration irradiates each of the target objects with the pattern light comprised of the first luminous pattern and the second luminous pattern once per target object, and receives return light based on reflection of the pattern light by each target object. This enables a distance of each target object to be accurately measured based on the return light from the corresponding target object.

This configuration also makes it possible to obtain distance information about a target object using at least one of a first return light based on the first luminous pattern and a second return light based on the second luminous pattern, resulting in distance images each having higher resolution to be obtained.

According to a second exemplary aspect of the present disclosure, there is provided a recognition apparatus for emitting a light to a surrounding environment around the recognition apparatus, and for receiving a return light based on reflection of the emitted light from the surrounding environment to thereby recognize the surrounding environment based on the return light. The recognition apparatus includes a first irradiation unit configured to irradiate a predetermined first irradiation region with a first light that expands over the first irradiation region, and a second irradiation unit configured to irradiate a predetermined second irradiation region with a second light that expands over the second irradiation region such that the second irradiation region is narrower than the first irradiation region, the second irradiation region at least partly overlapping with the first irradiation region, an intensity of the second light being larger than an intensity of the first light.

This configuration irradiates each of target objects with the first light and the second light, whose intensity is larger than the first light, once per target object while the narrower second irradiation region of the second light at least partly overlaps with the wider first irradiation region of the first light. Then, this configuration receives return light based on reflection of the first and second lights by each target object.

This therefore makes it possible to properly obtain the distance information item of each of the target objects for each pixel of the light receiving sensor even if the target objects having different reflectivities and different distances relative to the apparatus are located in the measurement region.

This configuration also makes it possible to obtain distance information about a target object using at least one of a first return light based on the first luminous pattern and a second return light based on the second luminous pattern, resulting in distance images each having higher resolution to be obtained.

According to a third exemplary aspect of the present disclosure, there is provided a distance measuring method. The distance measuring method includes (1) Irradiating a measurement region with a pattern light having a predetermined luminous pattern that is comprised of a first luminous pattern, and a second luminous pattern having a relatively low intensity lower than the intensity of the first luminous pattern (2) Receiving, by a light receiving sensor comprising a plurality of light receiving elements respectively corresponding to a plurality of pixels, a return light based on reflection of the pattern light by a target object located in the measurement region (3) Obtaining, based on a return light component received by each of the pixels of the light receiving sensor, a distance information item representing a distance value of the target object relative to the distance measuring apparatus for each of the pixels (4) Determining whether an intensity of each of the return light components received by the corresponding one of the pixels satisfies a predetermined measurement condition (5) Obtaining, as effective distance information, at least one distance value of at least one pixel of the light receiving sensor when it is determined that the intensity of the return light component received by the at least one pixel satisfies the predetermined measurement condition The third exemplary aspect obtains the same effects as those obtained by the first exemplary aspect.

According to a fourth exemplary aspect of the present disclosure, there is provided a distance measuring apparatus. The distance measuring apparatus includes an irradiation unit configured to irradiate a measurement region selectively using at least a first pattern light and a second pattern light. Each of the first and second pattern lights is comprised of a plurality of dot-shaped light components. The dot-shaped light components of the first pattern light have first distances therebetween, and the dot-shaped light components of the second pattern light have second distances therebetween. The first distances are different from the second distances. The distance measuring apparatus includes a light receiving sensor including a plurality of light receiving elements respectively corresponding to a plurality of pixels, and is configured to receive, for each of the pixels, a return light component based on reflection of the selectively generated one of the first and second pattern lights by a target object located in the measurement region. The distance measuring apparatus includes a measurement controller configured to measure, based on the return light component received by each of the pixels of the light receiving sensor, a distance information item representing a distance value of the target object relative to the distance measuring apparatus for each of the pixels.

This configuration irradiates each of target objects with the first light and the second light while the first distances between the dot-shaped light components of the first pattern light are different from the second distances between dot-shaped light components of the second pattern light once per target object. Then, this configuration receives return light based on reflection of the first and second lights by each target object.

This therefore makes it possible to properly obtain the distance information item of each of the target objects for each pixel of the light receiving sensor even if the target objects having different reflectivities and different distances relative to the apparatus are located in the measurement region.

This configuration also makes it possible to obtain distance information about a target object using at least one of a first return light based on the first luminous pattern and a second return light based on the second luminous pattern, resulting in distance images each having higher resolution to be obtained.

According to a fifth exemplary aspect of the present disclosure, there is provided a distance measuring apparatus. The distance measuring apparatus includes an irradiation unit. The irradiation unit includes a light source configured to generate a base pattern light comprised of base dot-shaped light components, and an optical system having a focal length and located to face the light source. The optical system is configured to emit the base dot-shaped light components therethrough. The irradiation unit is configured to change the focal length of the optical system to thereby irradiate, based on the base pattern light, the measurement region selectively using at least a first pattern light and a second pattern light while first distances between the dot-shaped light components of the first pattern light are different from second distances between the dot-shaped light components of the second pattern light.

The distance measuring apparatus includes a light receiving sensor comprising a plurality of light receiving elements respectively corresponding to a plurality of pixels, and configured to receive, for each of the pixels, a return light component based on reflection of the selectively generated one of the first and second pattern lights by a target object located in the measurement region. The distance measuring apparatus includes a measurement controller configured to obtain, based on the return light component received by each of the pixels of the light receiving sensor, a distance information item representing a distance value of the target object relative to the distance measuring apparatus for each of the pixels.

This configuration changes the focal length of the optical system to thereby change the divergence angle of each dot-shaped light element of the pattern light irradiated from the light source. This configuration therefore makes it possible to irradiate the measurement region with the pattern light having plural patterns using the single light source. Specifically, the irradiation unit is configured to (1) Expand the divergence angle of each dot-shaped light element of a pattern light output from the light source to thereby irradiate uniform pattern light with no dot-shaped light elements and distances therebetween (2) Reduce the divergence angle of each dot-shaped light element of the pattern light output from the light source to thereby irradiate a pattern light having a strong luminous pattern comprised of dot-shaped light elements Irradiating the measurement region with a pattern light having narrow distances between the dot-shaped light components enables distance information about a target object located in the measurement region to be obtained with higher resolution. In addition, it is possible to maintain the luminous pattern of the pattern light even if the focal length is changed, making it possible to always irradiate the measurement region with higher intensity. Even if a target object is located at a long distance relative to the apparatus or has a low reflectivity, it is possible to obtain accurate distance information while holding a sufficient S/N ratio of the return light, therefore making it possible to obtain accurate distance information about the target object.

According to a sixth exemplary aspect of the present disclosure, there is provided a distance measuring apparatus. The distance measuring apparatus includes an irradiation unit including (1) A light source configured to generate a pattern light comprised of dot-shaped light components (2) An optical system configured to emit the dot-shaped light components of the pattern light therethrough (3) An optical function member disposed on a part of an optical path of the pattern light between the light source and the optical system, and configured to refract or diffuse a part of the pattern light, the part of the pattern light passing through the optical function member The distance measuring apparatus includes a light receiving sensor comprising a plurality of light receiving elements respectively corresponding to a plurality of pixels, and configured to receive, for each of the pixels, a return light component based on reflection of the pattern light from the irradiation unit by a target object located in the measurement region.

The distance measuring apparatus includes a measurement controller configured to obtain, based on the return light component received by each of the pixels of the light receiving sensor, a distance information item representing a distance value of the target object relative to the distance measuring apparatus for each of the pixels.

This configuration causes a part of the pattern light emitted from the light source to deflect or diffuse using the optical function member, thus changes the profile of a part of the pattern light, which has passed through the optical function member, relative to the profile of the remaining part of the pattern light. This results in plural dot patterns being generated in the pattern light. This therefore makes it possible to properly obtain the distance information item of each of target objects for each pixel of the light receiving sensor even if the target objects having different reflectivities and/or different distances relative to the apparatus are located in the measurement region.

BRIEF DESCRIPTION OF THE DRAWINGS

Other aspects of the present disclosure will become apparent from the following description of embodiments with reference to the accompanying drawings in which:

FIG. 3 is an explanatory diagram schematically illustrating an example of a light receiving state for each of a plurality of scenes or situations;

FIG. 4 is an explanatory diagram schematically illustrating an example of a light receiving state for each of a plurality of scenes;

FIG. 5 is an explanatory diagram schematically illustrating an example of a light receiving state for each of a plurality of scenes;

FIG. 11 is an explanatory diagram schematically illustrating a method of tracking a target object recognized based on one-frame effective distance information items according to the first embodiment;

FIG. 17 is a timing chart schematically illustrating a third specific example of the irradiation pattern control task according to the second embodiment;

FIG. 21 is an explanatory diagram schematically illustrating another modification of the second embodiment.

DETAILED DESCRIPTION OF EMBODIMENT

Figure 1:
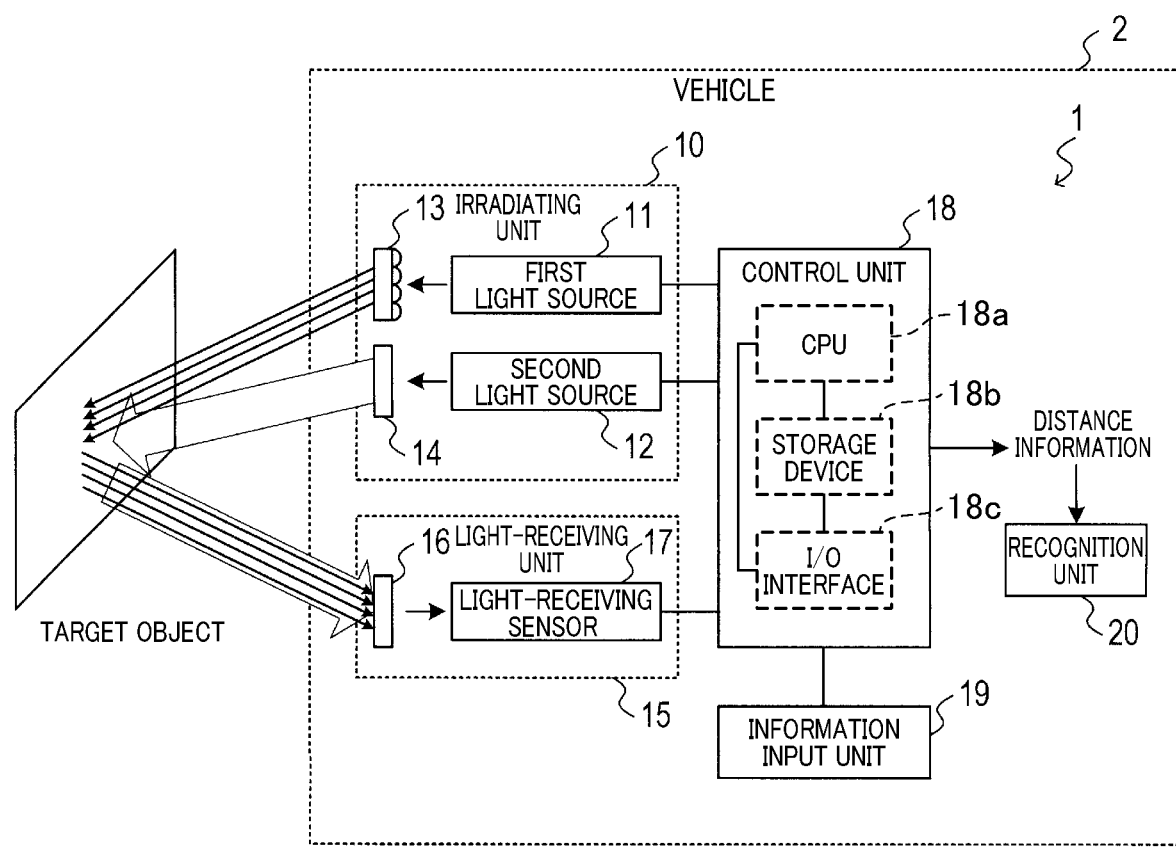
FIG. 1 is a block diagram schematically illustrating an overall configuration of a distance measuring apparatus according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description.

First Embodiment

Configuration of Distance Measuring Device

The following describes an example of the configuration of a distance measuring apparatus 1 according to the first embodiment with reference to FIG. 1.

The distance measuring apparatus 1 is mounted to a vehicle 2. The vehicle 2 is, for example, an automobile. As illustrated in FIG. 1, the distance measuring apparatus 1 includes an irradiation unit 10, a light receiving unit 15 including a light receiving lens 16 and a light receiving sensor 17, a control unit 18, an information input unit 19, and a recognition unit 20.

The distance measuring apparatus 1 has a function of transmitting light, such as laser light, to a measurement region around the vehicle 2, and measuring the distance of a target object located in the measurement region using return light, i.e. an echo; the return light is generated based on reflection of the irradiated light by the target object.

Specifically, the irradiation unit 10 is configured to irradiate the measurement region with a pattern light having formed a predetermined luminous pattern or a predetermined luminous profile along the optical axis of the pattern light. The pattern light irradiated by the irradiation unit 10 is comprised of a strong luminous pattern having a relatively high light intensity, and a weak luminous pattern having a relatively low intensity. That is, the pattern light provides the luminous pattern or luminous profile in which the strong luminous pattern and the weak luminous pattern simultaneously become luminous.

For example, the irradiation unit 10 includes a first light source 11 and a condensing lens 13, the combination of which is configured to irradiate light constituting the strong luminous pattern. The first light source 11 is comprised of, for example, a laser diode or the like that emits invisible light.

The condensing lens 13 is comprised of an optical element that converts light emitted from the first light source 11 into light components that are two-dimensionally distributed across the optical axis of the emitted light; the two-dimensionally distributed light components constitute the strong luminous pattern. The condensing lens 13 is comprised of, for example, a diffractive optical element that causes light passing therethrough to be diffracted into the two-dimensionally distributed light components constituting the strong luminous pattern.

Alternatively, the condensing lens 13 may be comprised of a compound lens disposed such that light emitted from the first light source 11 enters the compound lens. The compound lens is configured to project the strong luminous pattern of a light output surface of the first light source 11 to the measurement region. If such a compound lens is used as the condensing lens 13, a surface-emitting light source, such as a two-dimensional vertical cavity surface emitting laser (VCSEL) array, is preferably used as the first light source 11. The compound lens can be comprised of a lens having the same specifications as the specifications of the light receiving lens 16 described later. The strong luminous pattern converted by the condensing lens 13 is comprised of, for example, a plurality of concentrated light components, such as concentrated light dots or concentrated light stripes described later.

The irradiation unit 10 includes a second light source 12 and a diffusion lens 14, the combination of which is configured to irradiate light constituting the weak luminous pattern. The second light source 12 is comprised of, for example, a laser diode or the like that emits invisible light.

The diffusion lens 14 is an optical element that converts light, i.e. light whose intensity is modulated at a predetermined period, emitted from the second light source 12 into the weak luminous pattern two-dimensionally distributed.

The diffusing lens 14 is comprised of, for example, a lens that causes light passing therethrough to be two-dimensionally distributed as the weak luminous pattern having a uniform intensity. The weak luminous pattern converted by the diffusing lens 14 is comprised of one or more substantially uniform light components extending over a wider angular range than the range over which the strong luminous pattern extends.

The irradiation unit 10 is arranged to face the measurement region such that the luminous pattern of the light emitted from the irradiation unit 10 to the measurement region is comprised of the strong luminous pattern and the weak luminous pattern combined therewith.

If the distance measuring apparatus 1 is designed to be installed in a vehicle, the magnification, i.e. the ratio of the light emission intensity of the whole strong luminous pattern to the light emission intensity of the whole weak luminous pattern can be set to be, for example, within the range of 2 to 250 times.

For example, when it is assumed that the dynamic range of the light receiving sensor 17 for receiving return light from a target object is set to 60 dB, the range of the intensity ratio of the light emission intensity of the whole strong luminous portion to the whole weak luminous pattern, which can be received by the light receiving sensor 17 normally, is approximately determined as the range from 1 to 1000.

Under the above conditions, assuming that the intensity ratio between the whole strong luminous pattern and the whole weak luminous pattern is doubled, the apparatus 1 makes it possible to simultaneously monitor (1) The return light based on the weak luminous pattern from a first target object, which has a distance of 1 m relative to the apparatus 1 and has a reflectivity of 90%

(2) The return light based on the strong luminous pattern from a second target object, which has a distance of 15 m relative to the apparatus 1 and has a reflectance of 10%

Alternatively, assuming that the intensity ratio between the whole strong luminous pattern and the whole weak luminous pattern is set to 250 times, the apparatus 1 makes it possible to simultaneously monitor (1) The return light based on the whole weak luminous pattern from a first target object, which has a distance of 0.3 m relative to the apparatus 1 and has a reflectivity of 90%

(2) The return light based on the whole strong luminous pattern from a second target object, which has a distance of 50 m relative to the apparatus 1 and has a reflectance of 10%

Figure 2A:
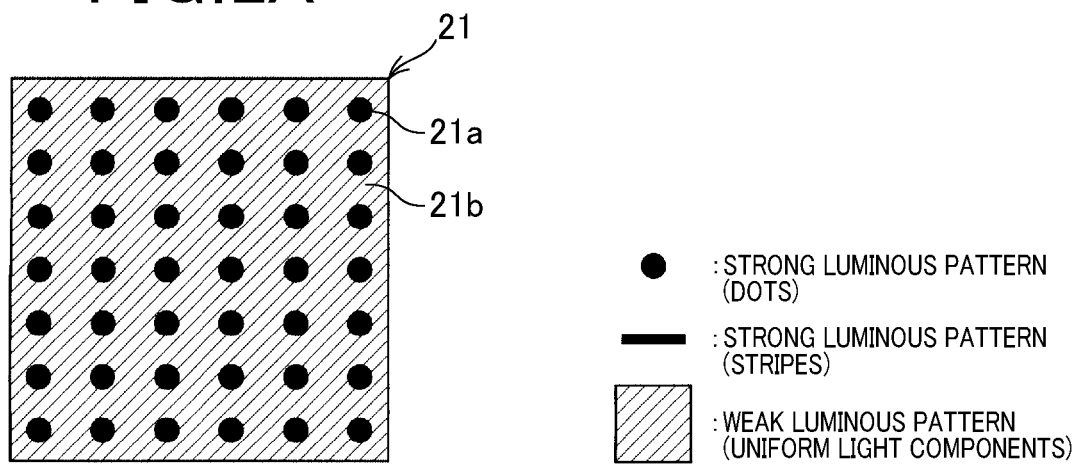
FIGS. 2A to 2C is a joint diagram schematically illustrating respective examples of luminous patterns according to the first embodiment.
Figure 2B:
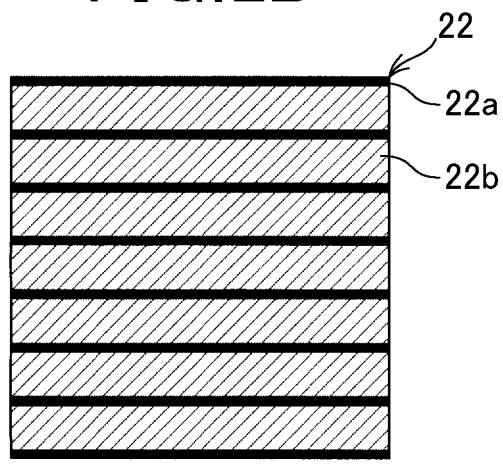
Figure 2C:
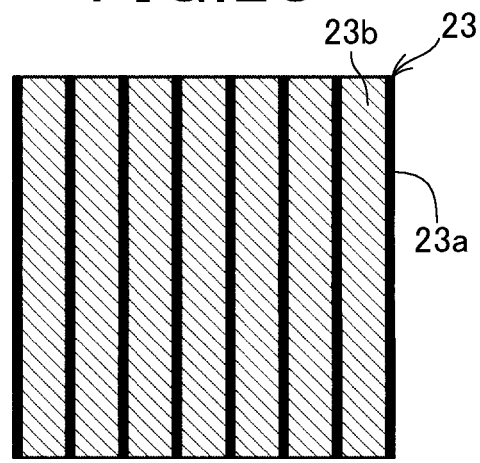

FIGS. 2A to 2C illustrate examples of the luminous pattern of the light emitted from the irradiation unit 10, which is comprise of the strong luminous pattern and the weak luminous pattern.

FIG. 2A shows the first example 21 of the luminous pattern, which has for example a substantially rectangular or square cross sectional profile along the optical axis of the emitted light, comprised of a plurality of dot-shaped light components 21a as the strong luminous pattern, which are arranged at regular distances in horizontal and vertical directions; the horizontal and vertical directions correspond to, for example, the respective width and height directions of the vehicle 2. The first example 21 of the luminous pattern is also comprised of the weak luminous pattern 21b distributed so as to fill in between the dot-shaped light components 21a of the strong luminous pattern.

FIG. 2B shows the second example 22 of the luminous pattern, which has for example a substantially rectangular or square cross sectional profile along the optical axis of the emitted light, comprised of a plurality of stripe-shaped light components 22a as the strong luminous pattern each extending in the horizontal direction; the stripe-shaped light components 22a are arranged at regular distances in the vertical direction. The second example 22 of the luminous pattern is also comprised of the weak luminous pattern 22b that includes stripe-shaped light components distributed so as to fill spaces between the stripe-shaped light components 22a of the strong luminous pattern.

FIG. 2C shows the third example 23 of the luminous pattern, which has for example a substantially rectangular or square cross sectional profile along the optical axis of the emitted light, comprised of a plurality of stripe-shaped light components 23a as the strong luminous pattern each extending in the vertical direction; the stripe-shaped light components 23a are arranged at regular distances in the horizontal direction. The third example 23 of the luminous pattern is also comprised of the weak luminous pattern 23b that includes stripe-shaped light components distributed so as to fill spaces between the stripe-shaped light components 23a of the strong luminous pattern.

Returning to the description of the block diagram of FIG. 1, as described above, the light receiving unit 15 includes the light receiving lens 16 and the light receiving sensor 17.

The light receiving sensor 17 has a plurality of light receiving elements, which respectively correspond to a plurality of pixels, two-dimensionally arranged in both the vertical and horizontal directions. The light receiving elements constitute a light receiving surface of the light receiving sensor 17.

The light receiving lens 16 is configured to focus light incident from the measurement region on the light receiving surface of the light receiving sensor 17.

The light received by the light receiving sensor 17 through the light receiving lens 16 includes return light generated based on a target-object's reflection of the pattern light irradiated from the irradiation unit 10.

The light receiving sensor 17 is configured to receive light focused on the light receiving surface thereof during a controllable shutter time, i.e. an exposure duration, so that each of the two-dimensionally arranged light-sensitive elements (pixels) receives a corresponding light component. Then, the light receiving sensor 17 converts, by each of the light receiving elements, a corresponding received light component into an electrical charge, i.e. an electrical signal, corresponding to the intensity of the received light component, thus outputting the electric signals as received light data, i.e. one frame image. That is, the light receiving sensor 17 is configured to cyclically perform a light reception operation to thereby obtain one frame image comprised of, for each pixel, the intensity of the received light component.

This enables the distance measuring apparatus 1 to monitor, in the measurement region, a field corresponding to one frame image.

The control unit 18 is an information processor comprised mainly of a CPU 18a, a storage device 18b including, for example, a RAM, a ROM, and/or a semiconductor memory such as a flash memory, an input/output (I/O) interface 18c, and other peripheral devices (not shown). The control unit 18 is implemented as, for example, a microcontroller in which functions as a computer system are integrated. The CPU 18a executes program instructions stored in the storage device 18b to thereby carry out the functions. One or plural microcontrollers can constitute the control unit 18.

The control unit 18 has a function of controlling each unit of the distance measuring apparatus 1 to thereby measure a distance to a target object existing around the vehicle 2, and outputting distance information representing the measured distance. Specifically, the control unit 18 causes the first light source 11 and the second light source 12 of the irradiation unit 10 to thereby irradiate, to the measurement region, pattern light comprised of the strong luminous pattern and the weak luminous pattern. The control unit 18 is configured to selectively execute a simultaneous measurement that simultaneously causes both the first light source 11 and the second light source 12 to emit light, and execute an alternate measurement that alternately causes the first light source 11 and the second light source 12 to emit light.

The control unit 18 obtains the received light data of the return light received by the light receiving unit 15 in accordance with the timing at which the pattern light has been sent from the irradiation unit 10. Then, the control unit 18 obtains, for each pixel, distance information representing a distance of a target object from the apparatus 1, based on the pattern light irradiated from the irradiation unit 10 and the return light received by the light receiving unit 15. The distance information items of the respective pixels of one frame image obtained by one cycle of the light reception operation of the light receiving sensor 17 represents distance values of respective coordinates in the light receiving sensor 17; these coordinates are previously assigned to the respective pixels of the light receiving sensor 17.

The control unit 18 of the distance measuring apparatus 1 is capable of performing one of a phase-difference measurement TOF method and a pulse measurement TOF method as examples of the TOF methods to thereby measure a distance of a target object located in the measurement region.

As described above, the phase-difference measurement TOF method measures a phase difference between (1) The pattern light based on illumination light having an intensity modulated by a high frequency signal, which is transmitted from the irradiation unit 10 to the measurement region (2) Return light generated based on reflection of the transmitted pulse light from a target object located in the measurement region Then, the phase-difference measurement TOF method converts the phase difference into a distance, thus obtaining the distance of the target object relative to the apparatus 1.

The phase-difference measurement TOF method has the following merits as an example. Specifically, the phase-difference measurement TOF uses such a light receiving sensor comprised of a large number of two-dimensionally arranged light receiving elements, i.e. pixels, making it possible to obtain a distance image of a target object with higher resolution. Adjusting the exposure duration by the control unit 18 enables the electrical charge stored in each pixel of the light receiving sensor 17 to be adjusted. This makes it possible to increase the S/N ratio of the return light, thus enabling a distance of a target object to be measured while eliminating, from the frame image, offset components due to background light as long as each pixel of the light receiving sensor 17 is kept unsaturated.

Alternatively, the pulse measurement TOF method causes the irradiation unit 10 to cyclically transmit the pattern light based on a light pulse to the measurement region, and cyclically measures a TOF during which the pattern light transmitted from the irradiation unit 10 is propagated to a target object and a return pulse, generated based on reflection of the transmitted pulse by a target object, is propagated back to the light receiving sensor 17. That is, the pulse measurement TOF method measures the TOF between a transmission timing at which the pattern light is transmitted from the irradiation unit 10 and a return pulse, generated based on reflection of the transmitted pulse by a target object is received by light receiving sensor 17.

Then, the pulse measurement TOF method converts the TOF into a distance, thus obtaining the distance of the target object relative to the apparatus 1.

The pulse measurement TOF method has the following merits as an example. Specifically, the pulse measurement TOF method prevents a false distance of a long-distance target object due to phase rotations of return pulses from the long-distance target object. Because the pulse measurement TOF method is capable of temporally separating return pulses of a target object, it is possible to eliminate multipath echoes from the return pulses from an actual target object. Adjusting the duty cycle of the irradiated light pulses to be a low value enables the amount of heat generated by the irradiation unit 10 to be reduced.

In addition, the control unit 18 has a function of (1) Obtaining, based on the intensity of a light component of the return light for each pixel of the light receiving unit 15, a distance information item for the corresponding pixel (2) Selecting, from the distance information items for all the pixels, predetermined distance information items respectively serving as effective distance information items (3) Outputting the selected effective distance information items to the recognition unit 20 as one-frame effective distance information, i.e. an effective distance information frame The information input unit 19 includes, for example, various sensors for inputting, to the control unit 18, vehicle information representing the travelling conditions of the vehicle 2 and environment information representing the conditions of the surrounding environment of the vehicle 2.

The vehicle information includes, for example, information indicative of the speed of the vehicle 2 measured by one of the sensors, and information indicative of the operating state of each direction indicator. The environment information includes, for example, information indicative of (1) The conditions of roads including a road on which the vehicle 2 is travelling (2) The types of target objects recognized by the recognition unit 20

(3) The distribution of the target objects recognized by the recognition unit 20

The information input unit 19 corresponds to, for example, an information obtaining unit according to the present disclosure.

The recognition unit 20 recognizes a specific object existing in the vicinity of the vehicle 2 based on the distance information output from the control unit 18. The object recognized by the recognition unit 20 may include, for example, a person, another traffic vehicle, an animal, or the like. As a method for recognizing a specific object from a distance image, a well-known image recognition technique can be used.

Description of Light Receiving Conditions for Each Scene

The following describes, with reference to FIGS. 3 to 6, plural cases in each of which the distance measuring apparatus 1 irradiates, to each of plural target objects, the pattern light including the strong luminous pattern and the weak luminous pattern, and receives return light based on reflection of the pattern light by each of the plural target objects; the plural target objects have different characteristics and/or different situations.

The case of FIG. 3 represents a scene where (1) There are two different target objects TO1 and TO2, one of which has a relatively low reflectivity, and the other of which has a relatively high reflectance (2) The target objects TO1 and TO2 have substantially the same distance relative to the distance measuring apparatus 1 of the vehicle 2

(3) The distance measuring apparatus 1 irradiates each of the target objects TO1 and TO2 with the pattern light including the strong luminous pattern and the weak luminous pattern, and receives return light based on reflection of the pattern light by each of the target objects TO1 and TO2

FIG. 3 shows that, for the target object TO1 with the low reflectivity, there is a possibility that the apparatus 1 cannot accurately obtain, from return light based on the weak luminous pattern, distance information about the target object TO1 due to the lack of the S/N ratio of the return light based on the weak luminous pattern. FIG. 3 also shows that, for the target object TO1 with the low reflectivity, the apparatus 1 accurately obtains, from return light based on the strong luminous pattern, distance information about the target object TO1, because the return light based on the strong luminous pattern holds sufficient light intensity to thereby enable the apparatus 1 to properly obtain distance information about the target object TO1.

In contrast, FIG. 3 shows that, for the target object TO2 with the high reflectivity, there is a possibility that the apparatus 1 cannot accurately obtain, from return light based on the strong luminous pattern, distance information about the target object TO2, because the light receiving sensor 17 is saturated due to excessive intensity of the return light based on the strong luminous pattern. FIG. 3 also shows that, for the target object TO2 with the high reflectivity, the apparatus 1 accurately obtains, from return light based on the weak luminous pattern, distance information about the target object TO2, because the return light based on the weak luminous pattern holds sufficient light intensity to thereby enable the apparatus 1 to properly obtain distance information about the target object TO2.

That is, as illustrated in FIG. 3, using the pattern light including the strong luminous pattern and the weak luminous pattern enables, even if there are the two target objects TO1 and TO2 respectively having relatively low and high reflectivities, distance information about each of the target objects TO1 and TO2 to be accurately obtained.

The case of FIG. 4 represents a scene where (1) There are two different target objects TO3 and TO4, one of which has a relatively long distance relative to the distance measuring apparatus 1, and the other of which has a relatively short distance relative to the distance measuring apparatus 1

(2) The target objects TO3 and TO4 have a substantially same reflectivity (3) The distance measuring apparatus 1 irradiates each of the target objects TO3 and TO4 with the pattern light including the strong luminous pattern and the weak luminous pattern, and receives return light based on reflection of the pattern light by each of the target objects TO3 and TO4

FIG. 4 shows that, for the target object TO3 with the long distance relative to the apparatus 1, there is a possibility that the apparatus 1 cannot accurately obtain, from return light based on the weak luminous pattern, distance information about the target object TO3 due to the lack of the S/N ratio of the return light based on the weak luminous pattern. FIG. 4 also shows that, for the target object TO3 with the long distance relative to the apparatus 1, the apparatus 1 accurately obtains, from return light based on the strong luminous pattern, distance information about the target object TO3, because the return light based on the strong luminous pattern holds sufficient light intensity to thereby enable the apparatus 1 to properly obtain distance information about the target object TO3.

In contrast, FIG. 4 shows that, for the target object TO4 with the short distance relative to the apparatus 1, there is a possibility that the apparatus 1 cannot accurately obtain, from return light based on the strong luminous pattern, distance information about the target object TO4, because the light receiving sensor 17 is saturated due to excessive intensity of the return light based on the strong luminous pattern. FIG. 4 also shows that, for the target object TO4 with the short distance relative to the apparatus 1, the apparatus 1 accurately obtains, from return light based on the weak luminous pattern, distance information about the target object TO4, because the return light based on the weak luminous pattern holds sufficient light intensity to thereby enable the apparatus 1 to properly obtain distance information about the target object TO4.

That is, as illustrated in FIG. 4, using the pattern light including the strong luminous pattern and the weak luminous pattern enables, even if there are the two target objects TO3 and TO4 respectively having relatively long and short distances relative to the apparatus 1, distance information about each of the target objects TO3 and TO4 to be accurately obtained.

The case of FIG. 5 represents a scene where (1) There are two different target objects TO5 and TO6 having a substantially same distance relative to the distance measuring apparatus 1 of the vehicle 2 and having a substantially same reflectivity (2) Under a situation where there is relatively strong ambient light, the distance measuring apparatus 1 irradiates the target object TO5 with the pattern light including the strong luminous pattern and the weak luminous pattern, and receives return light based on reflection of the pattern light by each of the target objects TO5 and TO6

(3) Under a situation where there is relatively weak ambient light, the distance measuring apparatus 1 irradiates the target object TO5 with the pattern light including the strong luminous pattern and the weak luminous pattern, and receives return light based on reflection of the pattern light by each of the target objects TO5 and TO6

FIG. 5 shows that, for the target object TO5 under the situation where there is relatively strong ambient light, there is a possibility that the apparatus 1 cannot accurately obtain, from return light based on the weak luminous pattern, distance information about the target object TO5 due to the lack of the S/N ratio of the return light based on the weak luminous pattern. FIG. 5 also shows that, for the target object TO5 under the situation where there is relatively strong ambient light, the apparatus 1 accurately obtains, from return light based on the strong luminous pattern, distance information about the target object TO5, because the return light based on the strong luminous pattern holds sufficient light intensity to thereby enable the apparatus 1 to properly obtain distance information about the target object TO5.

In contrast, FIG. 5 shows that, for the target object TO6 under the situation where there is relatively weak ambient light, the apparatus 1 accurately obtains, from each of return light based on the strong luminous pattern and return light based on the weak luminous light, distance information about the target object TO6, because each of the return light based on the strong luminous pattern and the return light based on the weak luminous light holds sufficient light intensity to thereby enable the apparatus 1 to properly obtain distance information about the target object TO6.

That is, as illustrated in FIG. 5, using the pattern light including the strong luminous pattern and the weak luminous pattern enables distance information about each of target objects to be accurately obtained even if each of the target objects is located under a situation where there is relatively strong ambient light or under a situation where there is relatively weak ambient light.

Figure 6:
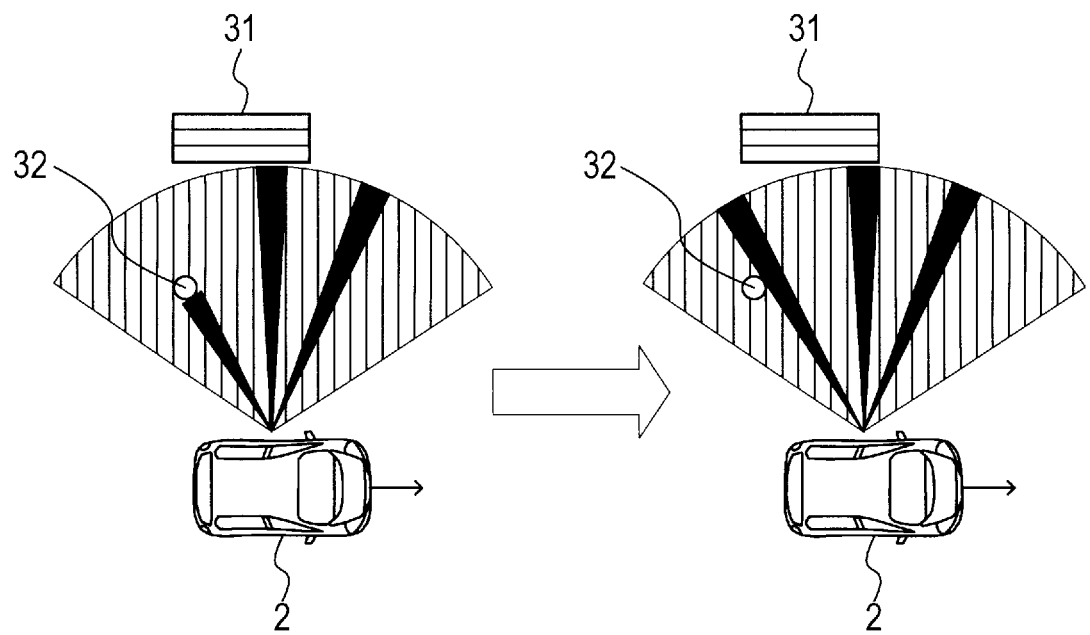
FIG. 6 is an explanatory diagram schematically illustrating an example of a change in the light receiving state due to movement of the own vehicle.

The case of FIG. 6 represents a scene where (1) There is a wall target object 31 having a relatively low reflectivity and a relatively long distance relative to the apparatus 1

(2) The distance measuring apparatus 1 irradiates the target object 31 with the pattern light including the strong luminous pattern and the weak luminous pattern, and receives return light based on reflection of the pattern light by the target object 31

(3) There is a poll-shaped target object 32 having a relatively high reflectivity and a relatively short distance relative to the apparatus 1

(4) The distance measuring apparatus 1 irradiates the target object 32 with the pattern light including the strong luminous pattern and the weak luminous pattern, and receives return light based on reflection of the pattern light by the target object 32

The left side of FIG. 6 shows that a part of the target object 31, which has a relatively low reflectivity and a relatively long distance relative to the apparatus 1 of the vehicle 2 that is travelling, is irradiated with a concentrated light component of the strong luminous pattern of the pattern light at a first timing. This enables a distance of the part of the target object 31 to be obtained. At the first timing, the pole-shaped target object 32, which has a relatively high reflectivity and a relatively short distance relative to the apparatus 1, is simultaneously irradiated with only a concentrated light component of the component of the strong luminous pattern of the pattern light. This may cause the intensity of the return light to become excessively large, resulting in the light receiving elements of the light receiving sensor 17 being saturated. This therefore may make it difficult to accurately obtain distance information about the target object 32 relative to the apparatus 1.

After the first timing, when the relative position of the target object 32 relative to the apparatus 1 changes based on the travel of the vehicle 2, the pole-shaped target object 32 is irradiated with a uniform light component of the weak luminous pattern of the pattern light at a subsequent second timing. This enables return light from the target object 32 based on the uniform light component of the weak luminous pattern to be received by the apparatus 1 at an appropriate intensity, making it possible to accurately obtain distance information about the target object 32 relative to the apparatus 1.

Description of Distance Measurement Task

Figure 7:
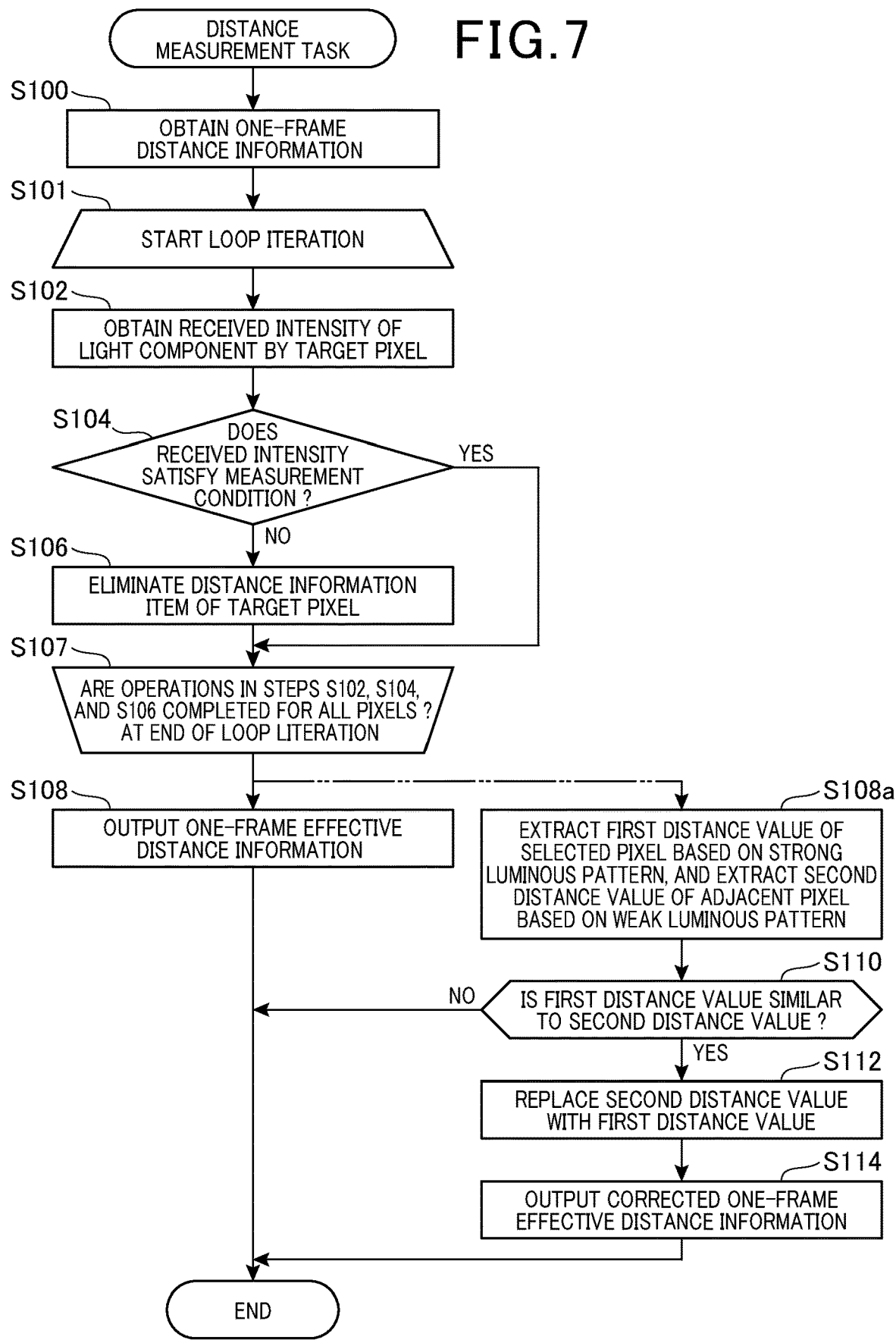
FIG. 7 is a flowchart schematically illustrating a distance measurement task according to the first embodiment.

The following describes a distance measurement task carried out by the control unit 18 with reference to the flowchart of FIG. 7. The control unit 18 is, for example, programmed to execute the distance measurement task every predetermined control cycle corresponding to one cycle of one frame image obtained by the light receiving sensor 17.

In step S100, the control unit 18 obtains one-frame distance information, i.e. a distance information frame, about a target object representing a distance of the target object from the apparatus 1, based on the pattern light irradiated from the irradiation unit 10 and the return light received by all the pixels of the light receiving unit 15. The distance information items of the respective pixels of one frame image obtained by one cycle of the light reception operation of the light receiving sensor 17 represents distance values, i.e. distance information items, of the respective coordinates in the light receiving sensor 17; the distance information items of the respective pixels of the light receiving sensor 17 constitute the one-frame distance information.

Specifically, the control unit 18 causes the first light source 11 and the second light source 12 of the irradiation unit 10 to thereby irradiate the measurement region with the pattern light comprised of the strong luminous pattern and the weak luminous pattern.

The control unit 18 obtains the received light data of the return light from a target object received by the light receiving unit 15 in accordance with the timing at which the pattern light has been sent from the irradiation unit 10. Then, the control unit 18 obtains, for each pixel, distance information representing a distance of the target object from the apparatus 1, based on the pattern light irradiated from the irradiation unit 10 and the return light received by the light receiving unit 15.

Next, the control unit 18 repeatedly executes a loop iteration from step S101 to S107 until the following operations in steps S102, S104, and S106 are completed for all the pixels of one frame image.

Specifically, the control unit 18 obtains the intensity of the light component received by a selected target pixel of the light receiving sensor 17 in step S102, and determines whether the intensity of the received light component obtained in step S102 satisfies a predetermined measurement condition in step S104.

The first embodiment uses, as the measurement condition, a condition that the intensity of the light component received by the target pixel lies within the range from a minimum intensity to a saturation threshold intensity. The minimum intensity is defined such that, if the intensity of the light component received by the target pixel is smaller than the minimum intensity, it is difficult to obtain, based on the intensity of the light component, an effective distance information item. The saturation threshold intensity is defined such that, if the intensity of the light component received by the target pixel exceeds the saturation threshold intensity, the target pixel, i.e. the target light receiving element, of the light receiving sensor 17 is saturated.

Upon determining that the intensity of the received light component obtained in step S101 satisfies the predetermined measurement condition (YES in step S104), the control unit 18 determines whether the operations in steps S102, S104, and S106 are completed for all the pixels of the one frame image in step S107. Upon determining that the operations in steps S102, S104, and S106 are not completed for all the pixels of one frame image (NO in step S107), the control unit 18 selects another pixel in the one frame image, and repeatedly carries out the loop iteration from step S101 to S107 for the selected pixel.

Otherwise, upon determining that the intensity of the received light component obtained in step S101 does not satisfy the predetermined measurement condition (NO in step S104), the control unit 18 eliminates the distance information item of the target pixel from the one-frame distance information in step S106. Then, the control unit 18 determines whether the operations in steps S102, S104, and S106 are completed for all the pixels of the one frame image in step S107.

Upon determining that the operations in steps S102, S104, and S106 are not completed for all the pixels of one frame image (NO in step S107), the control unit 18 selects another pixel in the one frame image, and repeatedly carries out the loop iteration from step S101 to S107 for the selected pixel.

Otherwise, upon determining that the operations in steps S102, S104, and S106 are completed for all the pixels of the one frame image (YES in step S107), the control unit 18 determines that the distance information items of the remaining pixels, which have not been eliminated by the operation in step S106 of the loop iteration, serve as one-frame effective distance information items in step S108. Note that the pixels that have been eliminated in step S106 will be referred to as eliminated pixels.

Then, the control unit 18 outputs the one-frame effective distance information items to the recognition unit 20 as one-frame effective distance information in step S108.

Description of Modified Measurement Task for Correction Between Frames

Figure 8:
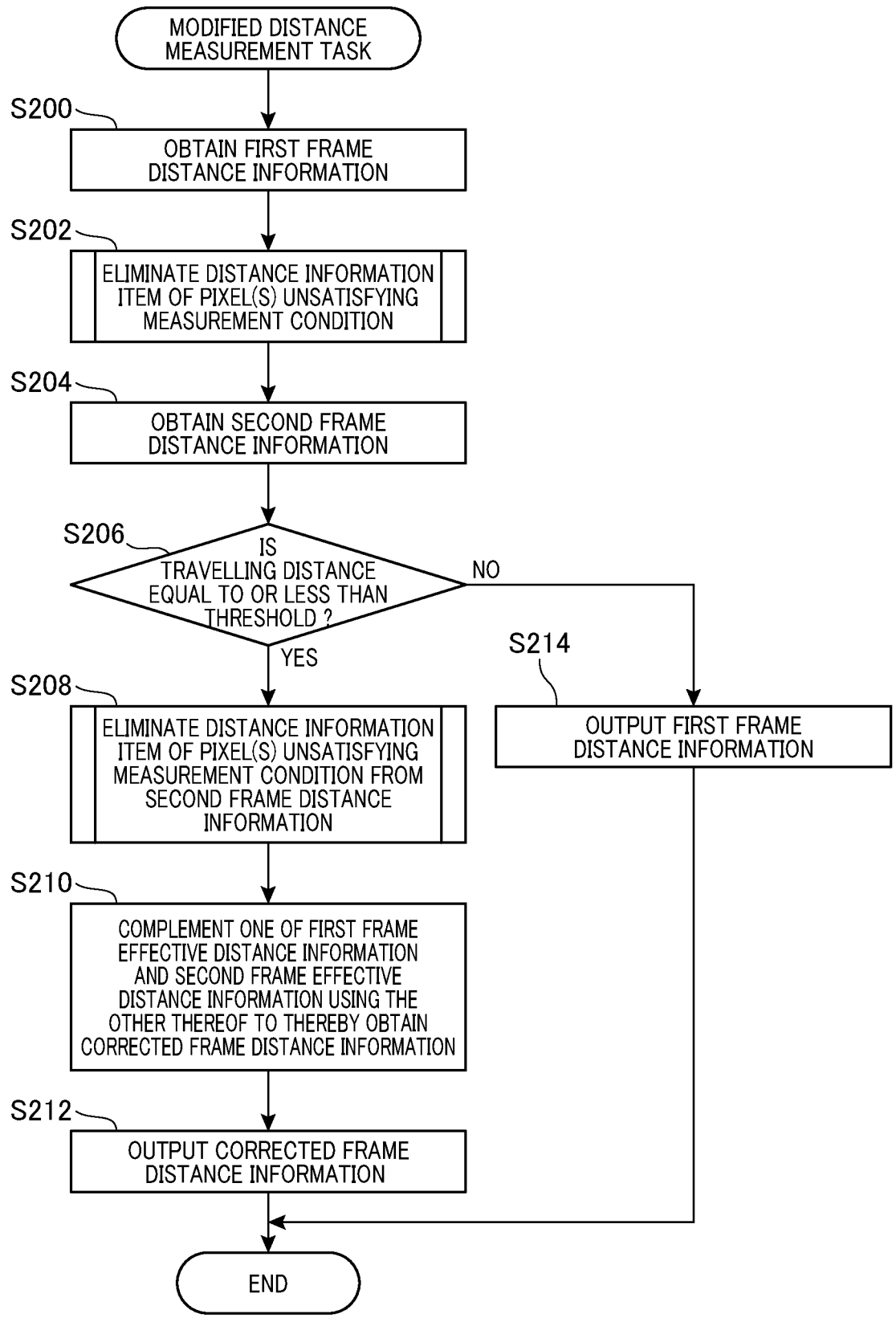
FIG. 8 is a flowchart schematically illustrating a modified measurement task according to the first embodiment.

The following describes a modified measurement task for correction between successive frames, i.e. frame images, with reference to FIG. 8.

In step S200, the control unit 18 obtains, at a first measurement timing, first-frame distance information about a target object representing a distance of a target object from the apparatus 1, based on the pattern light irradiated from the irradiation unit 10 and the return light received by all the pixels of the light receiving unit 15 in the same approach as the operation in step S100 of FIG. 7.

Next, the control unit 18 performs a task of eliminating one or more distance information items, i.e. one or more distance values, of one or more pixels from the first-frame distance information; the intensities of the one or more pixels do not satisfy the measurement condition in step S202. Specifically, the control unit 18 performs the loop iteration from step S101 to S107 as described above, thus obtaining first-frame effective distance information.

Following the operation in step S202, when a predetermined time interval has elapsed since the first measurement timing, the control unit 18 obtains, at a second measurement timing, second-frame distance information about the target object, based on the pattern light irradiated from the irradiation unit 10 and the return light received by all the pixels of the light receiving unit 15 in the same approach as the operation in step S100 of FIG. 7.

Subsequently, the control unit 18 determines whether a travelling distance of the vehicle 2 during the predetermined time interval is equal to or less than a predetermined threshold in step S206. Specifically, the control unit 18 calculates the travelling distance based on the speed of the vehicle 2 obtained from the information input unit 19 and the predetermined time interval in step S206.

Upon determining that the travelling distance of the vehicle 2 during the predetermined time interval is equal to or less than the predetermined threshold (YES in step S206), the control unit 18 carries out the following operation in step S208.

Specifically, the control unit 18 performs a task of eliminating one or more distance information items of one or more pixels from the second-frame distance information; the intensities of the one or more pixels do not satisfy the measurement condition in step S208. Specifically, the control unit 18 performs the loop iteration from step S101 to S107 as described above, thus obtaining second-frame effective distance information.

Next, the control unit 18 complements one of the first-frame effective distance information and the second-frame effective distance information obtained in respective steps S202 and S208 using at least the other of the first-frame effective distance information and the second-frame effective distance information, thus obtaining corrected frame distance information in step S210.

For example, in step S210, the control unit 18 extracts, from the second-frame effective distance information, one or more distance information items of one or more pixels that respectively correspond to the one or more eliminated pixels of the first-frame effective distance information. Then, the control unit 18 sets the extracted one or more distance information items as distance information items of the eliminated pixels of the first-frame effective distance information, thus obtaining corrected one-frame distance information items in step S210.

Next, the control unit 18 outputs the corrected one-frame distance information items to the recognition unit 20 in step S212.

Otherwise, upon determining that the travelling distance of the vehicle 2 during the predetermined time interval is more than the predetermined threshold (NO in step S206), the control unit 18 carries out the following operation in step S214.

In step S214, the control unit 18 outputs the first-frame effective distance information items, which have remained in step S202, to the recognition unit 20 as first-frame effective distance information.

Execution of the modified measurement task obtains, for example, the following benefit.

Specifically, if at least one pixel of the first frame is irradiated with a light component of the strong luminous pattern and a corresponding at least one pixel of the second frame is irradiated with a light component of the weak luminous pattern at a first measurement timing while the vehicle 2 is travelling, the at least one pixel of the first frame is likely to be irradiated with a light component of the strong luminous pattern and a corresponding at least one pixel of the second frame is irradiated with a light component of the strong luminous pattern at a next second measurement timing, because of movement of the vehicle 2.

For this reason, even if a light component of return light from a target object causes at least one pixel of the light receiving sensor 17 for the first frame is saturated, or there is a lack of the S/N in the return light for the first frame, it is possible to compensate for the saturation of the at least one pixel or the lack of the S/N of the return light with the second frame, resulting in the distance information items of the target object being accurately obtained.

Description of Mode Selection Task

As described above, the control unit 18 is capable of selectively executing the simultaneous mode to thereby simultaneously cause both the first light source 11 and the second light source 12 to emit light, and executing the alternative mode to alternately cause the first light source 11 and the second light source 12 to emit light.

Figure 9:
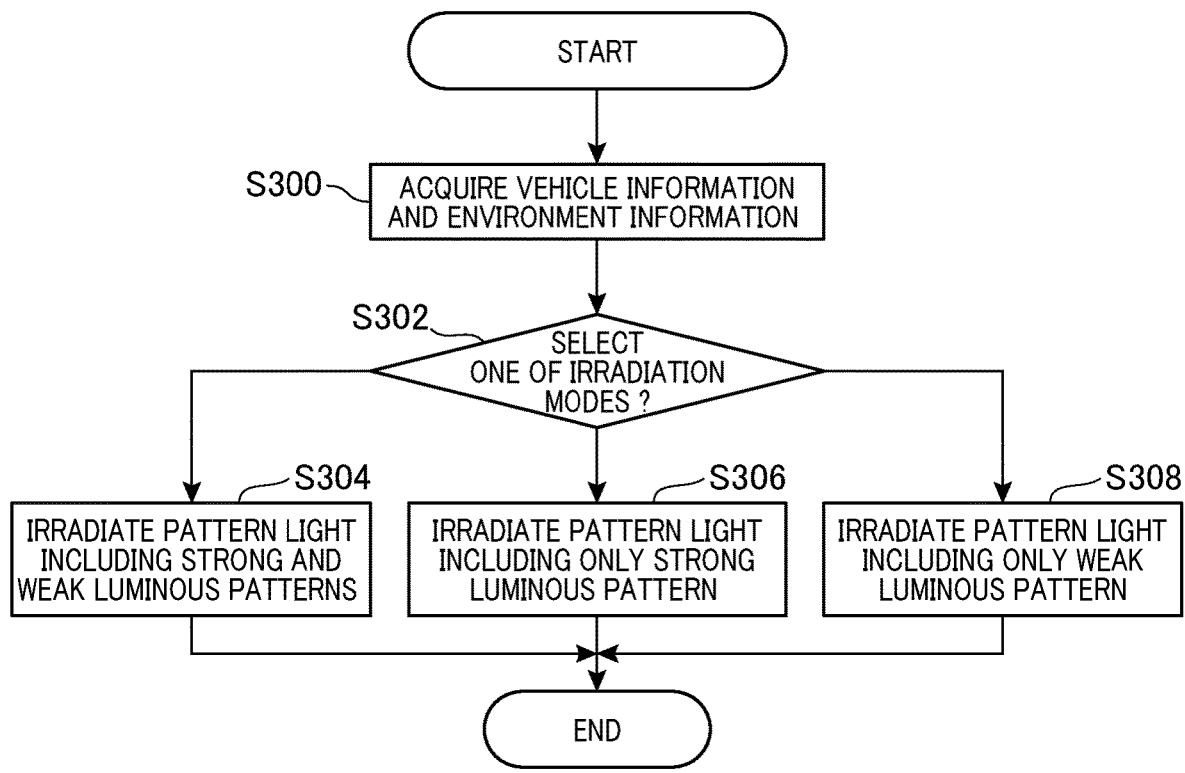
FIG. 9 is a flowchart schematically illustrating a mode selection task according to the first embodiment.

That is, the control unit 18 can be configured to perform a mode selection task in accordance with, for example, the procedure illustrated in the flowchart of FIG. 9. The control unit 18 is, for example, programmed to execute the mode selection task each time the control unit 18 causes at least one of the first light source 11 and the second light source 12 to emit light.

In step S300, the control unit 18 acquires, via the information input unit 19, the vehicle information representing the travelling conditions of the vehicle 2 and the environment information representing the conditions of the surrounding environment of the vehicle 2. Specifically, the control unit 18 acquires, as the vehicle information, information indicative of the speed of the vehicle 2, and information indicative of the operating state of each direction indicator. Additionally, the control unit 18 acquires, as the environment information, information indicative of (1) The conditions of roads including a road on which the vehicle 2 is travelling (2) The types of target objects recognized by the recognition unit 20

(3) The distribution of the target objects recognized by the recognition unit 20

In step S302, the control unit 18 selects one of irradiation modes, which include a simultaneous irradiation mode, i.e. a full irradiation mode, a far-field mode, and a near-field mode, based on the vehicle information and the environment information acquired in step S300.

The simultaneous irradiation mode simultaneously causes both the first light source 11 and the second light source 12 to irradiate the measurement region with both the strong luminous pattern and the weak luminous pattern to thereby measure a distance of a target object relative to the apparatus 1.

The far-field mode causes the first light source 11 to irradiate the measurement region with the strong luminous pattern to thereby measure a distance of a target object relative to the apparatus 1.

The near-field mode causes the second light source 12 to irradiate the measurement region with the weak luminous pattern to thereby measure a distance of a target object relative to the apparatus 1.

The simultaneous irradiation mode can cover any scene as illustrated in FIGS. 3-6.

The far-field mode is suitable for roughly measuring distances of far-field target objects relative to the apparatus 1.

The near-field mode is suitable for clearly measuring distances of near-field target objects relative to the apparatus 1.

Each of the far-field mode and the near-field mode has an advantage of, although the corresponding mode is used in limited scenes, reducing the energy consumption by the apparatus 1 and the amount of heat generated by the apparatus 1 while efficiently measuring a distance of a target object relative to the apparatus 1.

For example, when a predetermined near-field condition, which requires attention, is satisfied, the control unit 18 selects the near-field mode. For example, the predetermined near-field condition includes 1. The vehicle 2 is traveling at a low speed lower than a predetermined threshold speed 2. The vehicle 2 is temporarily stopped 3. The vehicle 2 is turning right or left at an intersection 4. An obstacle is detected around the vehicle 2

In addition, when a predetermined far-field condition, which requires little attention around the vehicle 2 and requires attention to a far field relative to the vehicle 2, is satisfied, the control unit 18 selects the far-field mode. For example, the predetermined far-field condition includes 1. The vehicle 2 is traveling at a high speed higher than the threshold speed 2. No obstacles are detected around the vehicle 2

Moreover, under a situation where neither the near-field condition nor the far-field condition is satisfied, the control unit 18 selects the full irradiation mode.

When selecting the full irradiation mode in step S302, the control unit 18 performs the full irradiation mode to simultaneously cause both the first light source 11 and the second light source 12 to irradiate the measurement region with both the strong luminous pattern and the weak luminous pattern, thus measuring a distance of a target object relative to the apparatus 1 in step S304.

When selecting the far-field mode in step S302, the control unit 18 causes the first light source 11 to irradiate the measurement region with the strong luminous pattern, thus measuring a distance of a target object relative to the apparatus 1 in step S306.

When selecting the near-field mode in step S302, the control unit 18 causes the second light source 12 to irradiate the measurement region with the weak luminous pattern, thus measuring a distance of a target object relative to the apparatus 1 in step S308.

Effects

The distance measuring apparatus 1 according to the first embodiment obtains the following effects.

The distance measuring apparatus 1 is configured to irradiate the measuring region around the vehicle 2 with the pattern light comprised of the strong luminous pattern and the weak luminous pattern, and receive return light based on reflection of the pattern light by a target object.

That is, even in a scene where there are target objects respectively located at a long distance and a short distance relative to the apparatus 1 and/or target objects respectively having a high reflectivity and a low reflectivity, this configuration irradiates each of the target objects with the pattern light comprised of the strong luminous pattern and the weak luminous pattern once per target object, and receives return light based on reflection of the pattern light by each target object. This enables a distance of each target object to be accurately measured based on the return light from the corresponding target object.

Let us consider a comparative example configured to irradiate a moving target object with light more than once while changing conditions of the irradiated light and/or changing the sensitivity of a light receiving sensor to thereby measure a distance of the target object more than once. As compared to the comparative example, this configuration of the distance measuring apparatus 1 results in reduction of measurement errors due to motion blur, because this configuration of the distance measuring apparatus 1 completes measurement of a distance of a target object relative to the apparatus 1 by one irradiation of the pattern light, so that it is possible to reduce the occurrence of motion blur.

This configuration makes it possible to obtain distance information about a target object using at least one of first return light based on the strong luminous pattern and second return light based on the weak luminous pattern, resulting in distance images each having higher resolution to be obtained.

Preferable Devices for Distance Measuring Apparatus 1

The distance measuring apparatus 1 can be configured to correct the distance information items, i.e. the distance values, between some pixels in all the pixels constituting one-frame distance information. The following describes this correction with reference to FIGS. 10A and 10B.

Figure 10:
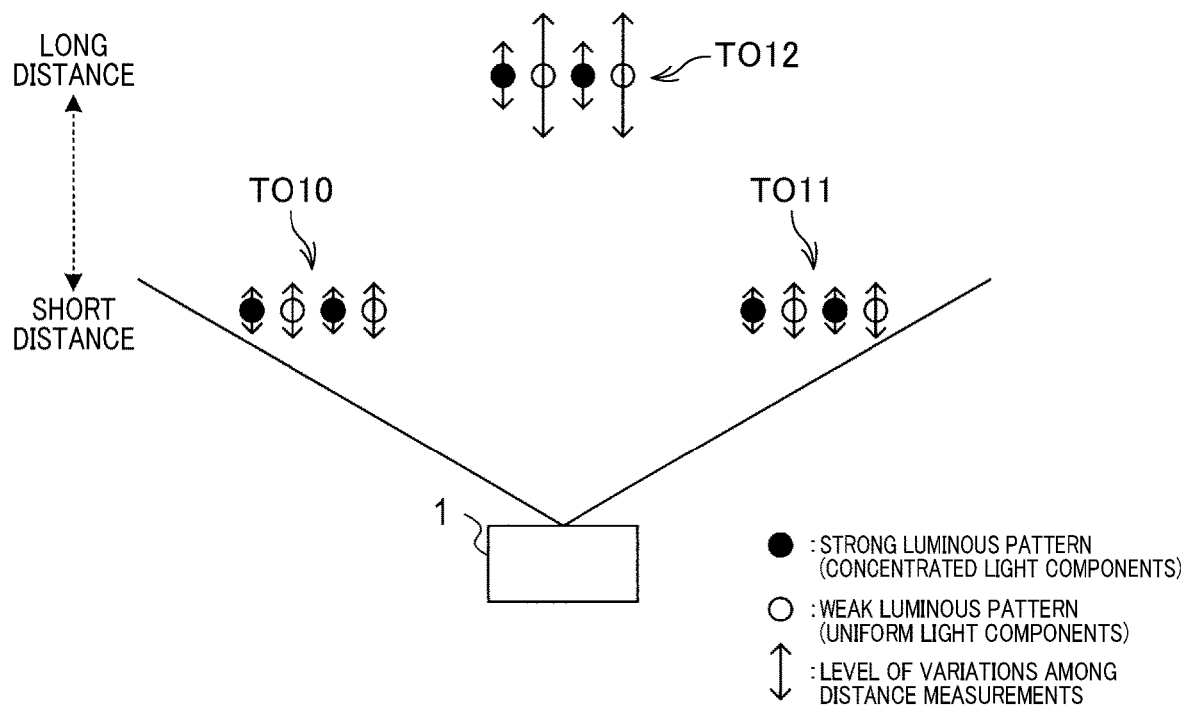
FIG. 10 is an explanatory diagram schematically illustrating an example of variations in a measured distance according to the first embodiment.

As illustrated in FIG. 10, let us assume that the distance measuring apparatus 1 is configured to irradiate the measuring region around the vehicle 2 with the pattern light comprised of the strong luminous pattern and the weak luminous pattern, and receive return light based on reflection of the pattern light by each of target objects TO10, TO11, and TO12, thus measuring a distance of each of the target objects TO10, TO11, and TO12 relative to the apparatus 1. In particular, let us assume that this distance measuring operation for each of the target objects TO10, TO11, and TO12 is carried out plural times, so that plural distance measurements for each of the target objects TO10, TO11, and TO12 are obtained. Note that the target objects TO10 and TO11 are located to be nearer than the target object TO12.

In FIG. 10, each black circle represents a portion of a corresponding target object to which a light component of the strong light pattern is irradiated, and each white circle represents a portion of a corresponding target object to which a light component of the weak light pattern is irradiated.

The distance measurements, i.e. measured distance values, of each black circle portion of the target object TO10 have a relatively small variation, i.e. a relatively high level of confidence thereamong, and similarly, the distance measurements of each black circle portion of each of the target objects TO11 and TO12 also have a relatively small variation thereamong.

In contrast, the distance measurements, i.e. measured distance values, of each white circle portion of the target object TO10 have a relatively large variation, i.e. a relatively low level of confidence thereamong, and similarly, the distance measurements of each white circle portion of each of the target objects TO11 and TO12 also have a relatively large variation thereamong.

In particular, the farther a target object relative to the apparatus 1 is, the greater the variations among the distance measurements of each white circle portion of the target object are (see comparison of the target objects TO10 and TO11 with the target object TO12 in FIG. 10).

From this viewpoint, the distance measuring apparatus 1 according to the first embodiment can be configured to extract (1) A first distance value of a selected pixel, which is based on a light component of the return light from the strong luminous pattern, in the obtained one-frame effective distance information items (2) A second distance value of an adjacent pixel, which is based on a light component of the return light from the weak luminous pattern, in the obtained one-frame effective distance information items (see step S108a of FIG. 7)

Then, the control unit 18 of the distance measuring apparatus 1 can be configured to determine whether the first distance value of the selected pixel is similar to the second distance value of the adjacent pixel (see step S110 in FIG. 10B).

Upon determining that the absolute difference between the first and second distance values is equal to or smaller than a predetermined threshold difference, the control unit 18 can be configured to determine that the first distance value of the selected pixel is similar to the second distance value of the adjacent pixel (YES in step S110). Then, the control unit 18 can be configured to replace the second distance value of the adjacent pixel with the first distance value of the selected pixel, thus correcting the one-frame effective distance information items (see step S112). Thereafter, the control unit 18 outputs the corrected one-frame effective distance information items to the recognition unit 20 as one-frame effective distance information (see step S114).

This correction task illustrated in FIG. 10B enables one or more distance information items corresponding to weak-confidence pixels of the light receiving sensor 17 to be replaced with one or more distance information items corresponding to strong-confidence pixels of the light receiving sensor 17. This makes it possible to obtain a distance image with higher accuracy and smaller variations while maintaining the high resolution of each of the distance information items.

In addition, the recognition unit 20 of the distance measuring apparatus 1 can be configured to perform a method of tracking a target object recognized based on the one-frame effective distance information items sent from the control unit 18.

The following describes this method with reference to FIG. 11.

Let us assume that the recognition unit 20 recognizes the shape of a person, such as a pedestrian, as the target object based on the one-frame effective distance information items sent from the control unit 18 (see FIG. 11).

As illustrated in FIG. 11, the shape of the person, i.e. the target object, is comprised of stronger luminance portions to which the light components of the strong luminous pattern are irradiated, and weaker luminance portions to which the light components of the weak luminous pattern are irradiated.

If the person is actually located at a long distance relative to the apparatus 1, distance values of pixels of the light receiving sensor 17, which corresponds to the respective weaker luminance portions, may have a relatively low level of confidence. This may make it difficult to obtain the shape of the target object, i.e. the person, accurately based on only the one-frame distance information items.

From this viewpoint, the recognition unit 20 can be configured to multiply the distance values of the respective pixels in the one-frame effective distance information items sent from the control unit at a first timing to the distance values of the respective pixels in the one-frame effective distance information items sent from the control unit 18 at a second timing after the first timing, thus obtaining greater-confidence distance information items. Then, the recognition unit 20 can be configured to clearly recognize the shape of the target object, i.e. the person illustrated in FIG. 11 even if the shape of the target object includes the weaker luminance portions.

On the other hand, a distance of each of the stronger luminance portions of the target object, i.e. the person, to which the light components of the strong luminous pattern are irradiated, relative to the apparatus 1 has a higher confidence, so that it is possible to recognize the distance of each of the stronger luminance portions of the target object relative to the apparatus 1 in accordance with only one-frame distance information items.

From this viewpoint, the recognition unit 20 can be configured to track at least one section of the shape of the target object, i.e. the person, recognized based on the set of one-frame effective distance information items cyclically sent from the control unit 18; the at least one section corresponds to at least one of the stronger luminance portions of the target object.

That is, the recognition unit 20 can be configured to track the at least one section of the target object, which corresponds to at least one of the stronger luminance portions of the target object, as a part of the same target object over successive frame images obtained by the control unit 18.

That is, even if the person recognized as the target object is comprised of mainly the weaker luminance portions to which the light components of the weak luminous pattern are irradiated, it is possible to reliably track the at least one section of the target object, which corresponds to at least one of the stronger luminance portions of the target object, as a part of the same target object over successive frame images. This is because the at least one tracked section of the target object, to which the light components of the strong luminous pattern are irradiated, has maintained a higher confidence over successive frames.

Figure 12:
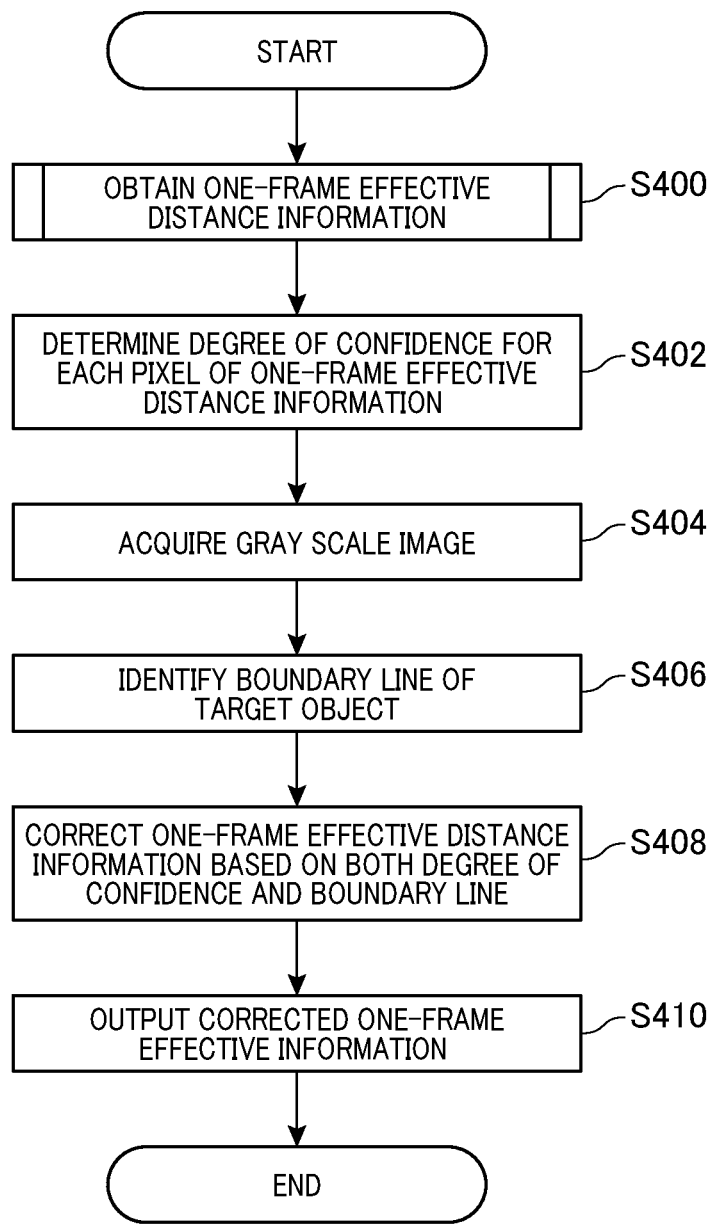
FIG. 12 is a flowchart schematically illustrating a correction task according to the first embodiment.

The distance measuring apparatus 1 can be configured to correct the distance information items, i.e. the distance values, between some pixels in all the pixels constituting one-frame distance information. The following describes this correction with reference to the flowchart of FIG. 12.

In step S400, the control unit 18 obtains one-frame effective distance information. Specifically, the control unit 18 carries out the same operation as the operations in steps S100 to S108 to thereby obtain one-frame effective distance information in step S400.

Next, the control unit 18 determines the degree of confidence for each pixel of the one-frame effective distance information acquired in step S400 in accordance with the intensity of a light component of the return light received by the corresponding pixel of the light receiving sensor 17 in step S402.

Specifically, the control unit 18 determines that at least one pixel of the one-frame effective distance information, whose received light intensity corresponds to a level of a light component of the return light from the strong luminous pattern, is defined as at least one strong-confidence pixel in step S402. Similarly, the control unit 18 determines that at least one pixel of the one-frame effective distance information, whose received light intensity corresponds to a level of a light component of the return light from the weak luminous pattern, is defined as at least one weak-confidence pixel in step S402.

Following the operation in step S402, the control unit 18 acquires a two-dimensional gray scale image of the measurement region in step S404; the gray scale image is an image in which the value of each pixel is comprised of only an amount of a corresponding light component of ambient light, i.e. only a corresponding luminous intensity of ambient light.

Specifically, the control unit 18 receives ambient light by the light receiving unit 15 while maintaining each of the first and second light sources 11 and 12 off, thus generating a gray scale image comprised of pixels each including, as a gray level, the corresponding light component of the ambient light in the measurement region in step S404. Alternatively, in a situation in which the amount of ambient light is insufficient at night or the like, the control unit 18 can be configured to (1) Continuously irradiate the measurement region with a weak luminous pattern of light as part of the ambient light without performing intensity modulation of the light; the weak luminous pattern of the light has a constant intensity (2) Receive the ambient light by the light receiving unit 15 to thereby generate a gray scale image comprised of pixels each including the corresponding light component of the ambient light in the measurement region in step S404

The operation in step S404 serves as, for example, a monitor controller according to the present disclosure.

In the following step S406, the control unit 18 identifies a boundary line of a target object included in the gray scale image acquired in step S404. Specifically, the control unit 18 detects edges of the target object using a well-known image processing technology for detecting, based on a difference between the gray levels of the respective pixels, thus identifying the boundary line of the target object based on the detected edges.

Next, the control unit 18 corrects the one-frame effective distance information obtained in step S400 based on both the degree of confidence for each pixel of the one-frame effective distance information, and the boundary line of the target object in step S408.

Specifically, the control unit 18 is programmed to (1) Extract or separate, from all the pixels of the one-frame effective distance information, pixels constituting the same target object in accordance with the boundary line (2) Determine whether the distance value of each of the strong-confidence pixels is similar to the distance value of at least one of the weak-confidence pixels located adjacent to the corresponding one of the strong-confidence pixels in step S408

Upon determining that the absolute difference between the distance value of each of the strong-confidence pixels and the distance value of the at least one of the weak-confidence pixels is equal to or smaller than a predetermined similarity threshold, the control unit 18 replaces the distance value of the at least one of the weak-confidence pixels with the distance value of each of the strong-confidence pixels in step S408. This results in the one-frame effective distance information obtained in step S400 being corrected.

Thereafter, the control unit 18 outputs the corrected one-frame effective information to the recognition unit 20 in step S410.

This therefore makes it possible to obtain a distance image with higher accuracy and smaller variations while maintaining the high resolution of each of the distance information items of the pixels.

Modification of First Embodiment

The first embodiment describes that the irradiation unit 10 is configured to generate the pattern light comprised of the strong luminous pattern and the weak luminous pattern using a plurality of light sources including the first light source 11 and the second light source 12, but the present disclosure is not limited to this configuration. Specifically, the irradiation unit 10 can be configured to convert light transmitted from a single light source into the pattern light comprised of the strong luminous pattern and the weak luminous pattern using an optical converter.

The light receiving sensor 17 and the control unit 18 can comprise of a common chip such that they are configured as an electronic circuit integrated on the common chip.

Second Embodiment

Configuration of Distance Measuring Device

Figure 13:
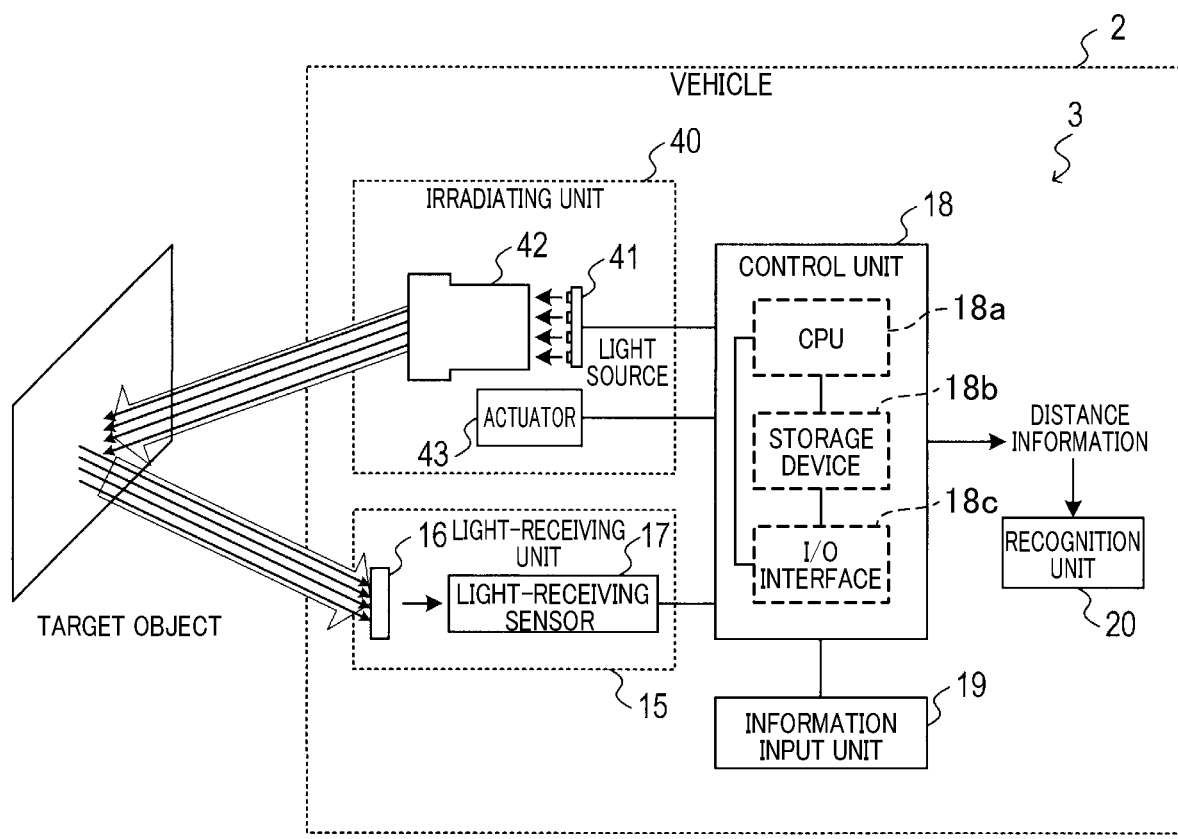
FIG. 13 is a block diagram schematically illustrating an overall configuration of a distance measuring apparatus according to the second embodiment of the present disclosure.

The following describes an example of the configuration of a distance measuring apparatus 3 according to the second embodiment with reference to FIG. 13.

The structure and/or functions of the distance measuring apparatus 3 according to the second embodiment are mainly identical to those of the distance measuring apparatus 1 except for the following points. So, the following describes mainly the different points.

The distance measuring apparatus 3 includes an irradiation unit 40 instead of the irradiation unit 10 of the distance measuring apparatus 1 of the first embodiment.

The distance measuring apparatus 3 also includes a light receiving unit 15 including a light receiving lens 16 and a light receiving sensor 17, a control unit 18, an information input unit 19, and a recognition unit 20; these components 15 to 20 are identical to those of the distance measuring apparatus 1 of the first embodiment.

The distance measuring device 3 has a function of transmitting light, such as laser light, to the measurement region around the vehicle 2, and measuring the distance of a target object located in the measurement region using return light, i.e. an echo, which is similar to the distance measuring apparatus 1 of the first embodiment; the return light is generated based on reflection of the irradiated light by the target object.

The irradiation unit 40 is configured to irradiate the measurement region with a pattern light having formed a predetermined luminous pattern or a predetermined luminous profile along the optical axis of the pattern light; the luminous pattern is comprised of a plurality of dot-shaped light components arranged at regular distances in horizontal and vertical directions.

For example, the irradiation unit 40 includes a light source 41, an optical system 42, and an actuator 43. The light source 41 is comprised of, for example, a single surface-emitting light source, such as a two-dimensional VCSEL array, mounted on an output surface of a two-dimensional board. The light source 41 is configured to emit a base pattern light comprised of a plurality of dot-shaped light components at its output surface; the dot-shaped light components are arranged at regular distances in horizontal and vertical directions.

The optical system 42 is arranged to face the two-dimensional light output surface of the light source 41 at an adjustable distance relative to the two-dimensional light output surface of the light source 41.

The optical system 42 is configured to spread the dot-shaped light components of the base pattern light emitted from the light output surface of the light source 41 into an irradiation pattern, i.e. a luminous pattern, which is comprised of the magnified dot-shaped light components, two-dimensionally distributed across the optical axis of the pattern light, thus projecting the irradiation pattern onto the measurement region.

The actuator 43 is a mechanical element for changing the irradiation pattern of the pattern light irradiated by the irradiation unit 40. Specifically, the actuator 43 is mechanically linked to at least one of the light source 41 and the optical system 42. The actuator 43 is configured to change the relative distance between the light source 41 and the optical system 42 to thereby change the distances between the dot-shaped light components in the pattern light projected in the measurement region. As the actuator 43, the second embodiment can use a voice coil motor, a stepping motor, a piezo element, or the like.

More specifically, as an example of a method of changing the distances between the dot-shaped light components, i.e. the size of each of the dot-shaped light components, the irradiation unit 40 adjusts the divergence angle of each dot-shaped light component of the pattern light to be projected onto the measurement region. The divergence angle of a dot-shaped light component serves as a parameter indicative of how the dot-shaped light component is diverged relative to, for example, the light source 41. For example, assuming that a line segment connecting between a center of a base dot-shaped light element on the output surface of the light source 41 and one of both ends of a diameter of the dot-shaped light element projected to the measurement region by the optical system 42 is referred to as L, the divergence angle of a dot-shaped light element projected to the measurement region by the optical system 42 can be expressed by the following equation:

$$\theta = \arctan(D/L)$$

where θ represents the divergence angle, and D represents the diameter of the dot-shaped light element.

Figure 14:
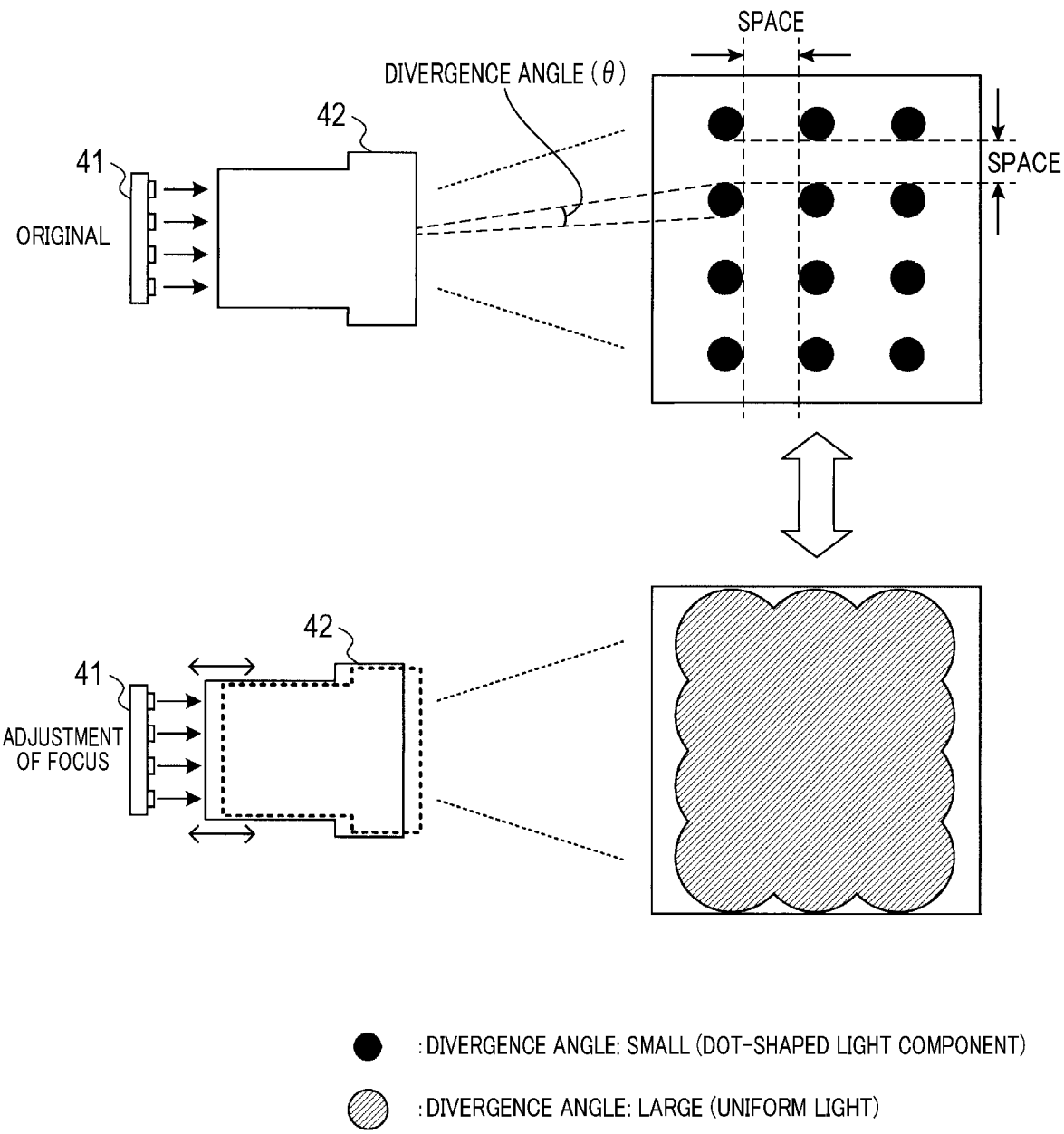
FIG. 14 is an explanatory diagram schematically illustrating an example of how to change a luminous pattern of a pattern light according to the second embodiment.

As illustrated in the upper part of FIG. 14, reducing the divergence angle of each irradiated dot-shaped light component enables each irradiated dot-shaped light element to converge, thus widening the distances, i.e. the spaces, between the dot-shaped light components of the pattern light projected onto the measurement region. In this example, causing each dot-shaped light component to converge enables a strong luminous pattern based on the relatively strong dot-shaped light components to be generated. If the light receiving sensor 17 is comprised of single photon avalanche diode (SPAD) arrays, the light receiving sensor 17 can be configured such that a predetermined number of SPAD elements are arranged to constitute each pixel of the light receiving sensor 17. Then, the light receiving sensor 17 can be configured to subject the outputs of the SPAD elements constituting each pixel to histogram process, thus outputting the histogram-processed outputs as the distance information item of each pixel of the light receiving sensor 17. In this example, for stabilizing the histogram-processed outputs of the light receiving sensor 17, it is preferable that each converged dot-shaped light element of the irradiated pattern light of the irradiation unit 40 substantially has a size similar to the size of each pixel of the light receiving sensor 17.

On the other hand, as illustrated in the lower part of FIG. 14, increasing the divergence angle of each irradiated dot-shaped light component enables the irradiated dot-shaped light components to diffuse, thus narrowing the distances, i.e. the distances, between the dot-shaped light components of the pattern light projected onto the measurement region, in other words, thus increasing the size, i.e. the diameter of each of the dot-shaped light elements. This results in the distances disappearing. In this example, causing the dot-shaped light components to diffuse to combine to each other enables a weak luminous pattern based on the relatively weak light to be generated. As a method of changing the distances between the dot-shaped light components, i.e. changing the size of each of the dot-shaped light components, a diffusion plate, such as a ground glass plate, can be interposed on the optical path of the pattern light output from the light source 41 to the measuring region, liquid crystal elements can be used to change the irradiation pattern, or a spatial light modulator can be used.

For example, the actuator 43 can be configured to move the optical system 42 back and forth relative to the fixedly located light source 41 in the optical axis direction. Shifting the optical system 42 for example, within the range from 0.1 to 1 mm in the optical axis direction enables the irradiated pattern light to sufficiently change from the two-dimensionally arranged dot-shaped pattern to uniform light pattern based on the combined dot-shaped light components.

Alternatively, the actuator 43 can be configured to move the light source 41 back and forth relative to the fixedly located optical system 42 in the optical axis direction. Shifting the light source 41 by, for example, approximately 1 mm in the optical axis direction enables the irradiated pattern light to sufficiently change from the two-dimensionally arranged dot-shaped pattern to uniform light pattern based on the combined dot-shaped light components. Even if the optical system 42 is configured to secure the waterproofness of the distance measuring apparatus 3 so that the optical system 42 cannot be easily moved, it is possible to easily shift the board of the light source 41.

Alternatively, if the optical system 42 is comprised of a focus adjustment mechanism 42a for moving a focus adjustment lens of the optical system 42 to thereby adjust the focus of the optical system 42, the actuator 43 can be configured to move the focus adjustment lens to thereby adjust the focus of the optical system 42, thus changing the distances between the dot-shaped light components, i.e. changing the size of each of the dot-shaped light components. Because the focus adjustment lens has a relatively light weight, it is possible to easily move the focus adjustment lens, thus easily adjusting the distances between the dot-shaped light components, that is, easily adjusting the size of each of the dot-shaped light components. If the optical system 42 has a focusing ring, the actuator 43 can rotate the focusing ring to thereby adjust the focus of the optical system 42, thus changing the distances between the dot-shaped light components, that is, adjusting the size of each of the dot-shaped light components.

Specifically, shifting one of the light source 41 and the optical system 43 to be close to the other thereof enables the divergence angle of each dot-shaped light component to be wider. In contrast, shifting one of the light source 41 and the optical system 43 to be far from the other thereof enables the divergence angle of each dot-shaped light component to be narrower.

The description returns to the block diagram of FIG. 13.

The control unit 18 has a function of controlling each unit of the distance measuring apparatus 3 to thereby measure a distance to a target object existing around the vehicle 2, and outputting distance information representing the measured distance.

Specifically, the control unit 18 causes the light source 41 of the irradiation unit 40 to thereby irradiate, to the measurement region, the pattern light, whose intensity is modulated at a predetermined period.

The control unit 18 is configured to control the actuator 43 to change the divergence angle of each dot-shaped light element of the pattern light irradiated from the optical system 42 at a timing based on a predetermined control mode, thereby performing control (hereinafter referred to as irradiation pattern control) of selectively irradiating the measurement region with one of predetermined irradiation patterns of the pattern light. A detailed description of the irradiation pattern control will be described later.

The control unit 18 obtains the received light data of the return light received by the light receiving unit 15 in accordance with the timing at which the pattern light has been sent from the irradiation unit 10. Then, the control unit 18 obtains, for each pixel, distance information representing a distance of a target object from the apparatus 3, based on the pattern light irradiated from the irradiation unit 10 and the return light received by the light receiving unit 15. The distance information items of the respective pixels of one frame image obtained by one cycle of the light reception operation of the light receiving sensor 17 represents distance values of respective coordinates in the light receiving sensor 17; these coordinates are previously assigned to the respective pixels of the light receiving sensor 17.

The control unit 18 of the distance measuring apparatus 3 is capable of performing one of the phase-difference measurement TOF method and the pulse measurement TOF method as examples of the TOF methods to thereby measure a distance of a target object located in the measurement region.

As described above, the phase-difference measurement TOF method measures a phase difference between (1) The pattern light based on illumination light having an intensity modulated by a high frequency signal, which is transmitted from the irradiation unit 40 to the measurement region (2) Return light generated based on reflection of the transmitted pulse light from a target object located in the measurement region Then, the phase-difference measurement TOF method converts the phase difference into a distance, thus obtaining the distance of the target object relative to the apparatus 3.

Alternatively, the pulse measurement TOF method causes the irradiation unit 40 to cyclically transmit the pattern light based on a light pulse to the measurement region, and cyclically measures a TOF during which the pattern light transmitted from the irradiation unit 40 is propagated to a target object and a return pulse, generated based on reflection of the transmitted pulse by a target object, is propagated back to the light receiving sensor 17.

Then, the pulse measurement TOF method converts the TOF into a distance, thus obtaining the distance of the target object relative to the apparatus 3.

Figure 15:
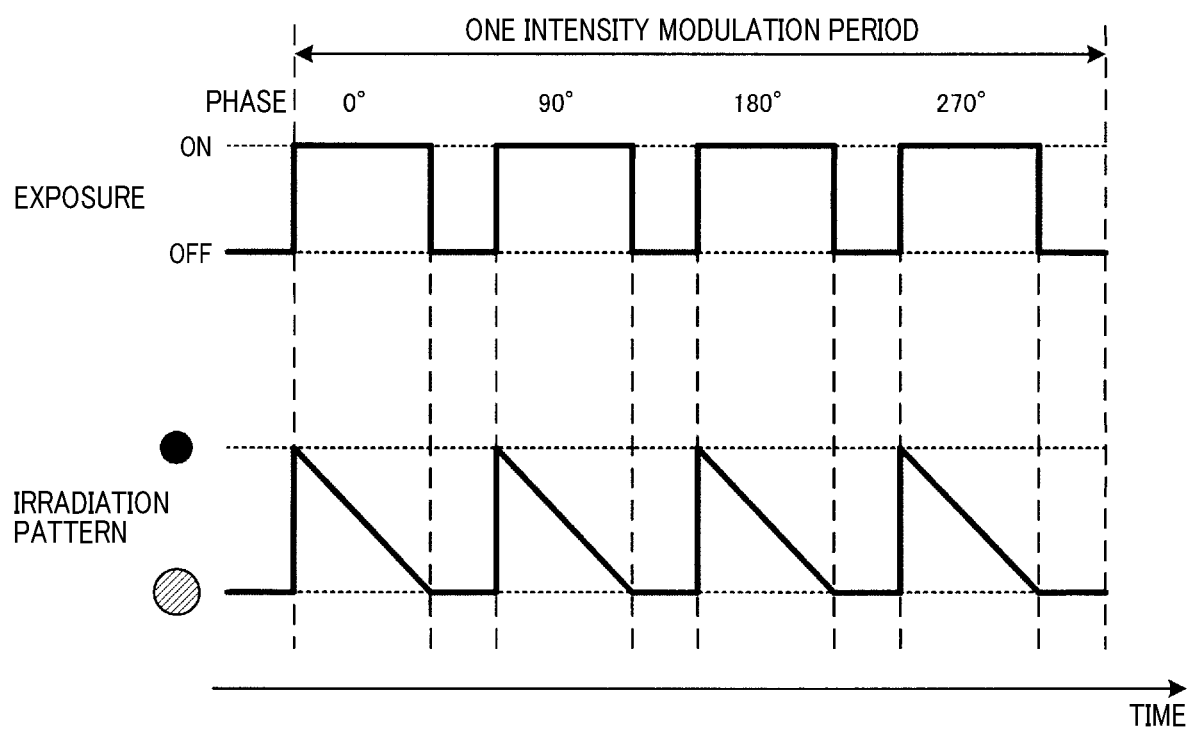
FIG. 15 is a timing chart schematically illustrating a first irradiation pattern control task according to the second embodiment.

In addition, the control unit 18 is programmed to perform the distance measurement task in the same manner as the first embodiment (see the flowchart of FIG. 7) to thereby (1) Obtain, based on the intensity of a light component of the return light for each pixel of the light receiving unit 15, a distance information item for the corresponding pixel (2) Select, from the distance information items for all the pixels, predetermined distance information items respectively serving as effective distance information items (3) Output the selected effective distance information items to the recognition unit 20 as one-frame effective distance information Description of Irradiation Pattern Control Task The following describes a first specific example of an irradiation pattern control task carried out by the control unit 18 with reference to FIG. 15.

Note that the control unit 18 is configured to perform the first specific example of the irradiation pattern control task while performing the distance measurement task using the phase-difference measurement TOF method.

That is, the control unit 18 causes the light source 41 to output the pattern light having an intensity that has been modulated in a predetermined period, referred to as an intensity modulation period. At this time, the control unit 18 adjusts the exposure duration of the light receiving sensor 17 to thereby perform exposure of the light receiving sensor 17 for the adjusted exposure duration at each timing corresponding to one of the phases of 0°, 90°, 180°, and 270° within one intensity modulation period; each of the phases of 0°, 90°, 180°, and 270° is in synchronization with a corresponding one of the pattern light output timings.

The upper part of FIG. 15 schematically illustrates each exposure timing (ON) of the light receiving sensor 17 and the exposure duration for each exposure timing as a timing chart.

Specifically, the control unit 18 continuously changes the divergence angle of each dot-shaped light element for each of the four exposure durations in one intensity modulation period. For example, as illustrated in the timing chart in the lower portion of FIG. 15, the control unit 18 controls the actuator 43 to reduce the divergence angle of each dot-shaped light element to thereby irradiate the pattern light having wider distances between the dot-shaped light elements at the start of each exposure duration, i.e. smaller sizes of the respective dot-shaped light elements. Then, the control unit 18 controls the actuator 43 to continuously increase the divergence angle of each dot-shaped light element up to a predetermined wide angle, so that the irradiated pattern light becomes uniform light with no dot-shaped light elements and distances therebetween at the end of each exposure duration.

Changing the divergence angle of each dot-shaped light element in each exposure duration makes it possible to perform distance measurement in a wider dynamic range using the plural irradiation patterns of the pattern light, each of which continuously change from the strong luminous pattern to the weak luminous pattern. This results in reduction of the influence of motion blur on the distance measurement of a target object even if the target object is moving.

Figure 16:
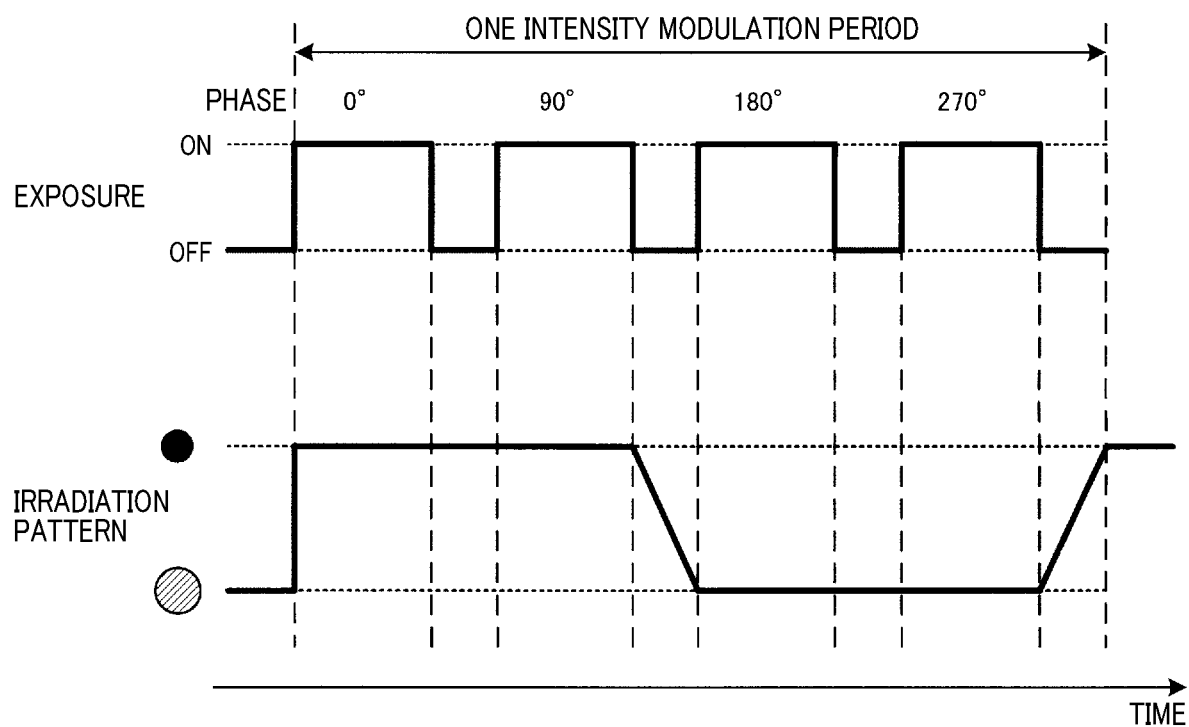
FIG. 16 is a timing chart schematically illustrating a second specific example of the irradiation pattern control task according to the second embodiment.

Next, the following describes a second specific example of the irradiation pattern control task carried out by the control unit 18 with reference to FIG. 16.

Note that the control unit 18 is configured to perform the second specific example of the irradiation pattern control task while performing the distance measurement task using the phase-difference measurement TOF method.

The upper part of FIG. 16 schematically illustrates each exposure timing (ON) of the light receiving sensor 17 and the exposure duration for each exposure timing as a timing chart.

That is, the control unit 18 causes the light source 41 to output the pattern light having an intensity that has been modulated in a predetermined intensity modulation period. At this time, the control unit 18 adjusts the exposure duration of the light receiving sensor 17 to thereby perform exposure of the light receiving sensor 17 for the adjusted exposure duration at each timing corresponding to one of the phases of 0°, 90°, 180°, and 270° within one intensity modulation period.

At this time, as illustrated in the timing chart in the lower portion of FIG. 16, the control unit 18 maintains the divergence angle of each dot-shaped light element to a predetermined narrow angle from the start of the exposure duration corresponding to the phase of 0° to the end of the exposure duration corresponding to the phase of 90° in one intensity modulation period to thereby irradiate the pattern light having wide distances between the dot-shaped light elements, i.e. small sizes of the respective dot-shaped light elements.

During a non-exposure duration from the end of the exposure duration corresponding to the phase of 90° to the start of the exposure duration corresponding to the phase of 180°, the control unit 18 controls the actuator 43 to continuously increase the divergence angle of each dot-shaped light element up to a predetermined wide angle, so that the irradiated pattern light becomes uniform light with no dot-shaped light elements and distances therebetween at the start of the exposure duration corresponding to the phase of 180°.

Thereafter, the control unit 18 maintains the divergence angle of each dot-shaped light element to the predetermined wide angle from the start of the exposure duration corresponding to the phase of 180° to the end of the exposure duration corresponding to the phase of 270° to thereby irradiate the pattern light with no dot-shaped light elements and distances therebetween.

During a non-exposure duration from the end of the exposure duration corresponding to the phase of 270° to the start of the exposure duration corresponding to the phase of 0°, i.e. 360°, the control unit 18 controls the actuator 43 to continuously decrease the divergence angle of each dot-shaped light element down to the predetermined narrow angle, so that the irradiated pattern light becomes the pattern light having wide distances between the dot-shaped light elements, i.e. small sizes of the respective dot-shaped light elements.

Changing the divergence angle of each dot-shaped light element each of during a non-exposure duration after the end of the exposure duration corresponding to the phase of 90° and during a non-exposure duration after the end of the exposure duration corresponding to the phase of 270° makes it possible to perform distance measurement in a wider dynamic range using two irradiation patterns of the pattern light within one intensity modulation period. This makes it possible to limit the number of changes of the irradiation pattern within one intensity modulation period while performing distance measurement in a wider dynamic range. In addition, changing the irradiation pattern during no non-exposure durations enables, even if the time required for changing the irradiation pattern fluctuates, the influences due to the fluctuations on the distance measurement results to be reduced.

Next, the following describes a third specific example of the irradiation pattern control task carried out by the control unit 18 with reference to FIG. 17.

Note that the control unit 18 is configured to perform the third specific example of the irradiation pattern control task while gradually increasing exposure durations using the phase-difference measurement TOF method or the pulse measurement TOF method.

The upper part of FIG. 17 schematically illustrates each exposure timing (ON) of the light receiving sensor 17 and the exposure duration for each exposure timing as a timing chart.

That is, the control unit 18 causes the light source 41 to output the pattern light having an intensity that has been modulated in a predetermined intensity modulation period. At this time, the control unit 18 perform exposure of the light receiving sensor 17 for example three times, i.e. a first time, a second time, and a third time, while gradually increasing the exposure durations of the respective first, second, and third times in this order.

At this time, as illustrated in the timing chart in the lower portion of FIG. 17, the control unit 18 maintains the divergence angle of each dot-shaped light element to a predetermined first angle, i.e. the widest angle, up to the end of the first exposure duration, i.e. the smallest exposure duration, to thereby irradiate the uniform pattern light with no distances between dot-shaped light elements.

During a non-exposure duration from the end of the first exposure duration to the start of the second exposure duration, the control unit 18 controls the actuator 43 to continuously reduce the divergence angle of each dot-shaped light element down to a predetermined second angle narrower than the first angle.

Thereafter, the control unit 18 maintains the divergence angle of each dot-shaped light element to the second angle during the second exposure duration longer than the first exposure duration to thereby irradiate the pattern light with middle wide distances between the dot-shaped light elements.

During a non-exposure duration from the end of the second exposure duration to the start of the third exposure duration, the control unit 18 controls the actuator 43 to continuously reduce the divergence angle of each dot-shaped light element down to a predetermined third angle narrower than the second angle.

Thereafter, the control unit 18 maintains the divergence angle of each dot-shaped light element to the third angle during the third exposure duration longer than the second exposure duration to thereby irradiate the pattern light with widest distances between the dot-shaped light elements.

After the end of the third exposure duration, the control unit 18 controls the actuator 43 to continuously increase the divergence angle of each dot-shaped light element to the first angle, i.e. the widest angle, to thereby irradiate the uniform pattern light with no distances between dot-shaped light elements.

The distance measurement by a short exposure duration is effective for a situation in which each light receiving element of the light receiving sensor 17 is easily saturated due to a short distance of a target object relative to the apparatus 3 or strong return light from the target object with a relatively high optical reflectivity. Irradiating the pattern light comprised of uniform light with no light-element gaps for such a short exposure duration therefore enables distance measurement with higher resolution to be carried out.

In contrast, distance measurement by a long exposure duration is effective for observing weak return light from a distant target object relative to the apparatus 3 or a target object having a relatively low optical reflectivity. Irradiating the pattern light composed dot-shaped light elements having wide intervals therebetween for such a long exposure duration therefore enables distance measurement of a distinct target object relative to the apparatus 3 or a target object having a relatively low optical reflectivity to be reliably carried out.

Figure 18:
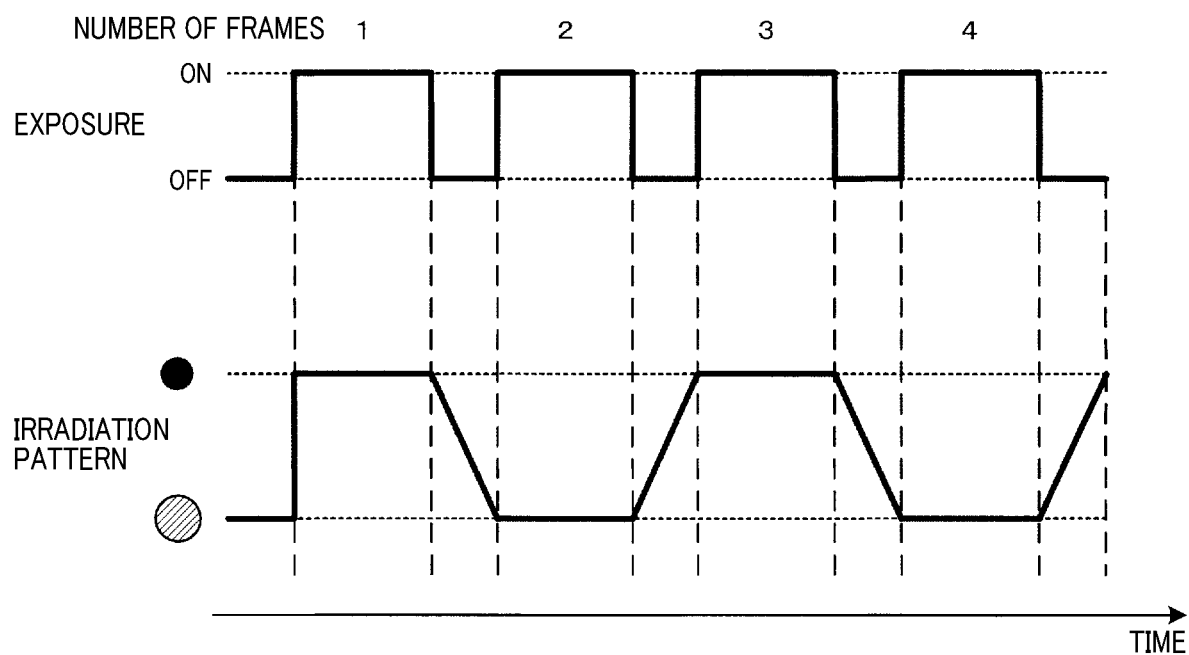
FIG. 18 is a timing chart schematically illustrating a fourth specific example of the irradiation pattern control task according to the second embodiment.

Next, the following describes a fourth specific example of the irradiation pattern control task carried out by the control unit 18 with reference to FIG. 18.

Note that the control unit 18 is configured to perform the fourth specific example of the irradiation pattern control task while performing the distance measurement task using the pulse measurement TOF method.

The upper part of FIG. 18 schematically illustrates each exposure timing (ON) of the light receiving sensor 17 and the exposure duration for each exposure timing as a timing chart.

That is, the control unit 18 causes the light source 41 to output the pattern light based on a light pulse to the measurement region every predetermined cycle that matches with a predetermined flame rate of the light receiving sensor 17. At this time, the control unit 18 perform exposure of the light receiving sensor 17 for example four times, i.e. a first time, a second time, a third time, and a fourth time; for each of the first to fourth times, the control unit 18 perform exposure of the light receiving sensor 17 during a predetermined exposure duration.

At this time, as illustrated in the timing chart in the lower portion of FIG. 18, the control unit 18 maintains the divergence angle of each dot-shaped light element to a predetermined narrow angle during the first exposure duration corresponding to the first time to thereby irradiate the pattern light with wide distances between the dot-shaped light elements.

During a non-exposure duration from the end of the first exposure duration to the start of the second exposure duration corresponding to the second time, the control unit 18 controls the actuator 43 to continuously increase the divergence angle of each dot-shaped light element down to a predetermined wide angle.

Thereafter, the control unit 18 maintains the divergence angle of each dot-shaped light element to the aide angle during the second exposure duration to thereby irradiate the pattern light with no distances between dot-shaped light elements.

During a non-exposure duration from the end of the second exposure duration to the start of the third exposure duration corresponding to the third time, the control unit 18 controls the actuator 43 to continuously reduce the divergence angle of each dot-shaped light element down to a predetermined narrow angle.

Thereafter, the control unit 18 maintains the divergence angle of each dot-shaped light element to the narrow angle during the third exposure duration corresponding to the third time to thereby irradiate the pattern light with wide distances between the dot-shaped light elements.

During a non-exposure duration from the end of the third exposure duration to the start of the fourth exposure duration corresponding to the fourth time, the control unit 18 controls the actuator 43 to continuously increase the divergence angle of each dot-shaped light element up to the predetermined wide angle.

That is, the control unit 18 alternatively changes the divergence angle of each dot-shaped light element between the narrow angle and the wide angle.

When performing the distance measurement task using the pulse measurement TOF method, the control unit 18 is configured to change a current irradiation pattern to another each time of having performed distance measurement for each exposure duration. This configuration makes it possible to eliminate the possibility of the distance information items, i.e. distance data items, being corrupted during change of each dot-shaped light element, i.e. change of the size or the diameter of each dot-shaped light element.

Additionally, the control unit 18 according to the second embodiment can be configured to, upon determining that, after obtaining distance information items during one exposure duration, the light receiving elements are saturated, perform an irradiation pattern control routine in accordance with the reliability of obtained distance information items to thereby irradiate the measurement region with the pattern light based on uniform light to thereby obtain again additional distance information items in accordance with the reliability of the previously obtained distance information items. The control unit 18 according to the second embodiment can also be configured to, upon determining that, after obtaining distance information items during one exposure duration, there is a lack of the S/N ratio of return light, perform the irradiation pattern control routine in accordance with the reliability of obtained distance information items to thereby irradiate the measurement region with the pattern light based on dot-shaped light elements to thereby obtain again additional distance information items in accordance with the reliability of the previously obtained distance information items.

Figure 19:
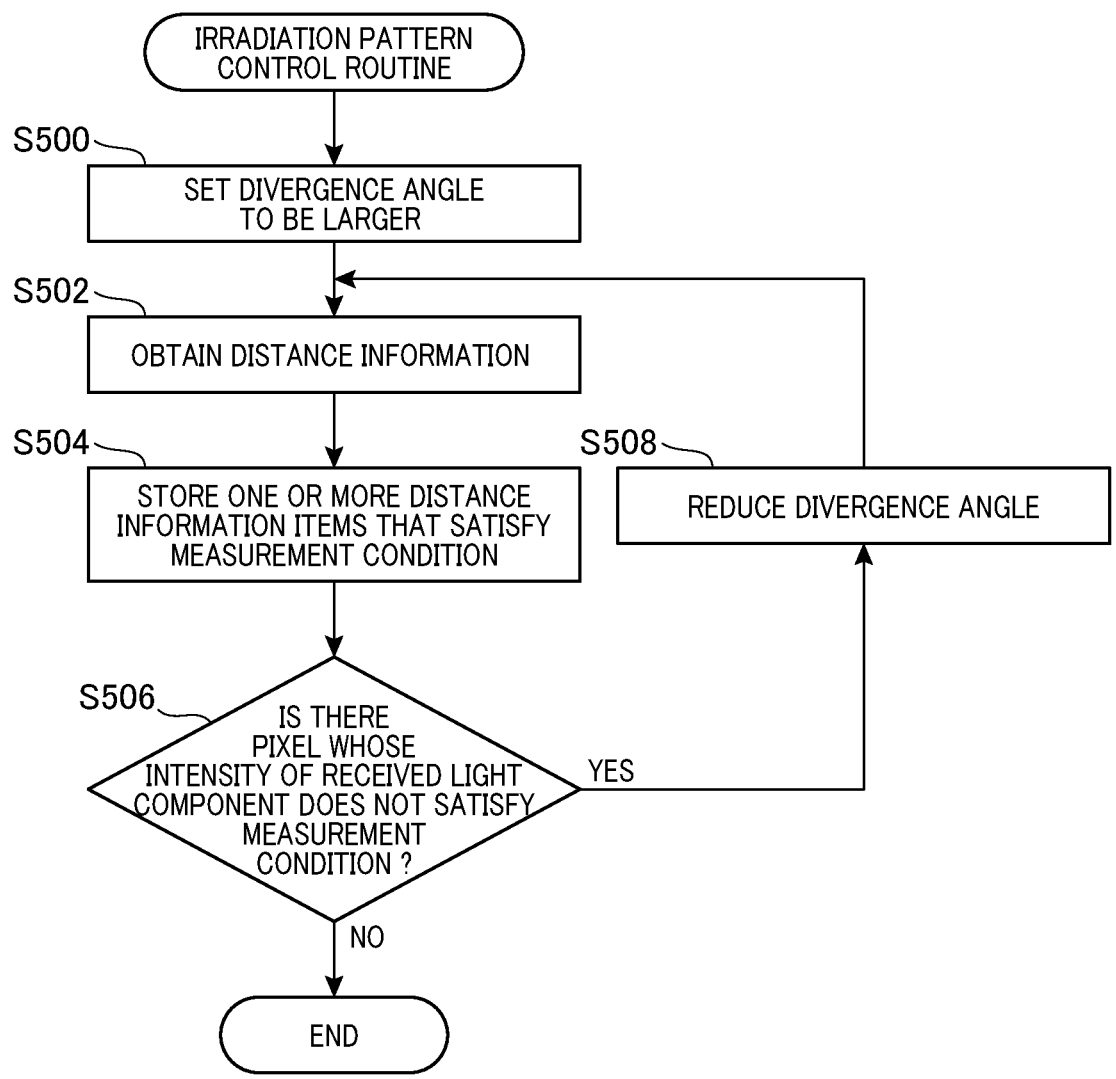
FIG. 19 is a flowchart schematically illustrating an example of an irradiation pattern control routine according to the second embodiment.

Next, the following describes how the control unit 18 performs the irradiation pattern control routine with reference to the flowchart of FIG. 19.

In step S500, the control unit 18 sets a current value or an initial value of the divergence angle to a value larger by a predetermined angle than the current value or initial value of the divergence angle. Specifically, the control unit 18 causes the actuator 43 to shift one of the light source 41 and the optical system 43 to be close to the other thereof, thus setting the current value or initial value of the divergence angle to the larger value of the divergence angle as a current value.

Next, the control unit 18 irradiates the measurement region with the pattern light pulse with the current value of the divergence angle of each dot-shaped light component having been set in step S500, and receives a return pulse generated based on reflection of the irradiated pattern light pulse by a target object in step S502. Then, in step S502, the control unit 18 obtains, as one-frame distance information, a distance information item for each pixel of the light receiving unit 15 based on the pattern light pulse and the return pulse.

In step S504, the control unit 18 obtains the intensity of the light component received by each pixel of the light receiving sensor 17, and stores one or more distance information items corresponding to one or more pixels in the storage device 18b when the intensity of the received light component of each of the one or more pixels satisfies a predetermined measurement condition. Like the first embodiment, the second embodiment uses, as the measurement condition, the intensity of the light component received by a target pixel lies within the range from the minimum intensity to the saturation threshold intensity.

Then, the control unit 18 determines whether there is at least one pixel of the light receiving sensor 17, whose intensity of the received light component does not satisfy the predetermined measurement condition in step S506.

Upon determining that the intensity of the received light component of at least one pixel satisfies the measurement condition (NO in step S506), the control unit 18 terminates the irradiation pattern control routine.

Otherwise, upon determining that the intensity of the received light component of at least one pixel does not satisfy the measurement condition (YES in step S506), the control unit 18 reduces the current value of the divergence angle to a value smaller by a predetermined value than the current value, thus setting the smaller value of the divergence angle as a current value thereof in step S508.

Following the operation in step S508, the control unit 18 irradiates the measurement region with the pattern light pulse with the current value of the divergence angle of each dot-shaped light component having been set in step S508, and receives a return pulse generated based on reflection of the irradiated pattern light pulse by a target object in step S502. Then, in step S502, the control unit 18 obtains a distance information item for each pixel of the light receiving unit 15 based on the pattern light pulse and the return pulse. Thereafter, the control unit 18 repeatedly performs the operations in steps S502 to S508 until the determination in step S506 is negative.

Effects

The control unit 18 according to the second embodiment is configured to control at least one of the optical system 42 and the actuator 43 to thereby change the divergence angle of each dot-shaped light element of the pattern light irradiated from the light source 41. This configuration therefore makes it possible to irradiate the measurement region with a pattern light having plural patterns using the single light source 41. Specifically, the control unit 18 is configured to (1) Expand the divergence angle of each dot-shaped light element of the pattern light output from the light source 41 to thereby irradiate uniform pattern light with no dot-shaped light elements and distances therebetween (2) Reduce the divergence angle of each dot-shaped light element of the pattern light output from the light source 41 to thereby irradiate pattern light having a strong luminous pattern comprised of dot-shaped light elements Irradiating the measurement region with a pattern light having plural patterns enables, even if there are various types of target objects having different distances relative to the apparatus 3 and/or different optical reflectivities in the measurement region, proper distance information for each of the various types of target objects to be obtained.

Modification of Second Embodiment

The control unit 18 of the distance measuring apparatus 3 according to the second embodiment is configured to adjust the focus of the optical system 42 to thereby change the divergence angle of each dot-shaped light element of the pattern light irradiated from the light source 41, thus expanding or reducing the distances between the dot-shaped light elements of the pattern light. The present disclosure is however not limited to this configuration.

Figure 20:
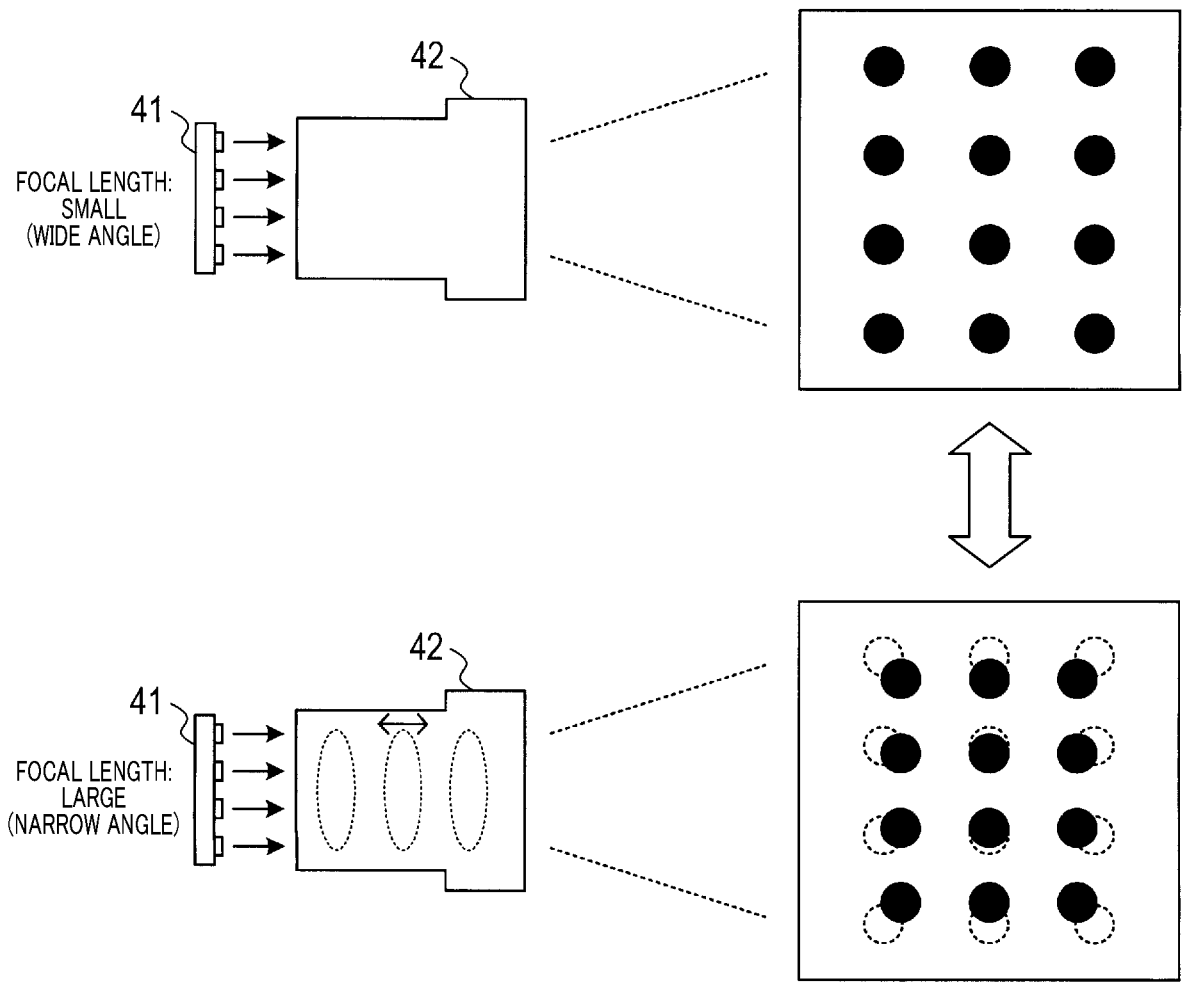
FIG. 20 is an explanatory diagram schematically illustrating a modification of the second embodiment.

Specifically, the control unit 18 can be configured to adjust a focal length of the optical system 42 to thereby change the divergence angle of each dot-shaped light element of the pattern light irradiated from the light source 41, thus expanding or reducing the distances between the dot-shaped light elements of the pattern light, an example of which is disclosed in FIG. 20.

Specifically, a focal-length adjustable lens unit including, for example, an available zoom lens and/or a varifocal lens an be used as the optical system 42, and the actuator 43 is linked to the optical system 42 and capable of adjusting the focal length of the optical system 42. That is, the control unit 18 can cause the actuator 43 to change the focal length of the optical system 42, thus changing the divergence angle of each dot-shaped light element of the pattern light irradiated from the light source 41.

As illustrated in FIG. 20, the control unit 18 can cause the actuator 43 to reduce the focal length of the optical system 42, thus expanding the divergence angle of each dot-shaped light element of the pattern light irradiated from the light source 41. This results in the pattern light having the wider distances of the dot-shaped light elements being projected onto the measurement region.

Additionally, as illustrated in FIG. 20, the control unit 18 can cause the actuator 43 to increase the focal length of the optical system 42, thus reducing the divergence angle of each dot-shaped light element of the pattern light irradiated from the light source 41. This results in the pattern light having the narrower distances of the dot-shaped light elements being projected onto the measurement region.

This configuration of the distance measuring apparatus 3, which changes the focal length of the optical system 42 to correspondingly change the irradiation pattern of the pattern light, enables dot-shaped light elements each having a high intensity to be projected onto the measurement region while each of the dot-shaped light elements has a wide divergence angle or a narrow-divergence angle. This therefore enables, even if target objects have a relatively low reflectivity and/or target objects each have a far distance relative to the apparatus 3, distance information for each of the various types of target objects to be sufficiently obtained. Adjusting the focal length of the optical system 42 to sufficiently reduce the distances between the dot-shaped light elements enables distance images each having higher resolution to be obtained.

Note that it is preferable that the control unit 18 causes the actuator 43 to change the focal length of the optical system 42 within a predetermined range from a lower limit to an upper limit inclusive; the lower limit is set to a first length corresponding to a predetermined widest divergence angle of each dot-shaped light element, and the upper limit is set to a second length that is twice as large as the first length. This enables the dot-shaped light elements with sufficiently short distances therebetween to be obtained.

The distance measuring apparatus 3 according to the second embodiment is configured to uniformly change the whole of the luminous pattern of the pattern light irradiated from the irradiation unit 40, but the distance measuring apparatus 3 can be configured to partially change the luminous pattern of the pattern light irradiated from the irradiation unit 40.

Specifically, as illustrated in FIG. 21, an irradiation unit 40A according to this modification is comprised of a transparent or translucent flat plate 44 that has been inserted on a part of the optical path of the pattern light irradiated from the light source 41; the flat plate 44 enables the pattern light output from the light source 41 to sufficiently pass therethrough.

The flat plate 44 causes the pattern light from the light source 41, a part of which has passed therethrough, to be partially changed based on an optical function of the flat plate 44. Specifically, the flat plate 44 causes a part of the pattern light from the light source 41, which has passed through the flat plate 44, to have a focal length being shifted relative to an original focal length of the remaining part of the pattern light; the remaining part of the pattern light has not passed through the flat plate 44. The shift of the focal length of the part of the pattern light causes the spread of the pattern light to change. For this reason, the flat plate 44 through which a part of the pattern light output from the light source 41 passes enables this part of the pattern light to have a luminous pattern that is different from a luminous pattern of the remaining part of the pattern light. For example, using a ground glass-like translucent plate as the flat plate 44 causes a part of the pattern light, which has passed through the flat plate 44, to be diffused, making it possible to obtain the pattern light having a uniform irradiation pattern in which the boundary of each dot-shaped light element is blurred.

In the case of FIG. 21, the flat plate 44 has been inserted on an upper portion of the optical path between the light source 41 and the optical system 42 to thereby diffuse a lower portion of the pattern light projected from the optical system 42 to a front space located ahead of the optical system 42. This results in an upper portion of the pattern light projected from the optical system 42 to the front space having a luminous pattern comprised of dot-shaped light elements having relatively wide distances therebetween. In contrast, this results in a lower portion of the pattern light projected from the optical system 42 to the road surface having a luminous pattern comprised of uniform light with no dot-shaped light elements and distances therebetween. The irradiation unit 40A according to this modification therefore enables small target objects, such as small steps or ring stops, on the road surface to be detected higher resolution. In contrast, the irradiation unit 40A according to this modification enables distant vehicles or the like to be detected earlier based on the dot-shaped light elements irradiated from the optical system 42 to an upper side of the optical path.

Note that the distance measuring apparatus according to this modification can be configured to removably insert the flat plate 44 on a part of the optical path of the pattern light irradiated from the light source 41. Specifically, the flat plate 44 is mechanically linked to the actuator 43, and the control unit 18 causes the actuator 43 to move the flat place 44 to be inserted on a part of the optical path of the pattern light or to be removed from the part of the optical path.

On the basis of situations around the vehicle 2, the control unit 18 can be configured to switchably perform (1) A first irradiation mode that obtains the distance information of a target object set forth above while the flat plate 44 is disposed on a part of the optical path between the light source 41 and the optical system 42

(2) A second irradiation mode that obtains the distance information of a target object set forth above while no flat plate 44 is disposed on the optical path between the light source 41 and the optical system 42

The control unit 18 can be configured to select one of various patterns of the pattern light in accordance with at least one of the vehicle information and environment information input from the information input unit 19.

Specifically, like the procedure illustrated in the flowchart of FIG. 9 described in the first embodiment, the control unit 18 acquires, via the information input unit 19, the vehicle information representing the travelling conditions of the vehicle 2 and the environment information representing the conditions of the surrounding environment of the vehicle 2 in step S300.

In step S302, the control unit 18 selects one of the far-field mode and the near-field mode based on the vehicle information and the environment information acquired in step S300.

The far-field mode according to this modification causes the light source 41 to irradiate the measurement region with a pattern light comprised of dot-shaped light components with narrow distances between the dot-shaped light components.

The near-field mode according to this modification causes the light source 41 to irradiate the measurement region with uniform pattern light with no dot-shaped light components and no distances therebetween.

When selecting the far-field mode in step S302, the control unit 18 causes the light source 41 and the actuator 43 to irradiate the measurement region with the pattern light comprised of the dot-shaped light components, thus measuring a distance of a target object relative to the apparatus 1 (see step S306).

When selecting the near-field mode in step S302, the control unit 18 causes the light source 41 and the actuator 43 to irradiate the measurement region having the uniform pattern light with no dot-shaped light components and no distances therebetween, thus measuring a distance of a target object relative to the apparatus 1 (see step S308).

Other Modifications

The functions of one element in each embodiment can be distributed as plural elements, and the functions that plural elements have can be combined into one element. At least part of the structure of each embodiment can be replaced with a known structure having the same function as the at least part of the structure of the corresponding embodiment. A part of the structure of each of the first and second embodiments can be eliminated. At least part of the structure of each of the first and second embodiments can be replaced with or added to the structure of the other of the first and second embodiments. All aspects included in the technological ideas specified by the language employed by the claims constitute embodiments of the present disclosure.

The present disclosure can be implemented by various embodiments; the various embodiments include systems each including the distance measuring apparatus 1 or 3, programs for serving a computer as the control unit 18 of the distance measuring apparatus 1 or 3, storage media, such as non-transitory media, storing the programs, and distance information acquiring methods.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A distance measuring apparatus comprising:
an irradiation unit configured to irradiate a measurement region with a pattern light having a predetermined luminous pattern;
a light receiving sensor comprising a plurality of light receiving elements respectively corresponding to a plurality of pixels, and configured to receive, for each of the pixels, a return light component based on reflection of the pattern light by a target object located in the measurement region; and
a measurement controller configured to obtain, based on the return light component received by each of the pixels of the light receiving sensor, a distance information item representing a distance value of the target object relative to the distance measuring apparatus for each of the pixels,
wherein:
the irradiation unit includes:
a first light source configured to emit a first luminous pattern; and
a second light source configured to emit a second luminous pattern having a relatively low intensity lower than an intensity of the first luminous pattern,
the irradiation unit being configured to irradiate the measurement region with the pattern light comprised of at least one of the first luminous pattern and the second luminous pattern; and
the measurement controller is configured to:
determine whether an intensity of each of the return light components received by the corresponding one of the pixels satisfies a predetermined measurement condition; and
obtain, as effective distance information, at least one distance value of at least one pixel of the light receiving sensor when it is determined that the intensity of the return light component received by the at least one pixel satisfies the predetermined measurement condition;
wherein:
the irradiation unit is configured to individually irradiate the measurement region with the first luminous pattern and the second luminous pattern;
the measurement controller is configured to:
cause the irradiation unit to irradiate the measurement region with both the first luminous pattern and the second luminous pattern as the pattern light in a first irradiation mode; and
cause the irradiation unit to irradiate the measurement region selectively with one of the first luminous pattern and the second luminous pattern in a second irradiation mode; and
wherein:
the distance measuring apparatus is installable in a mobile object; and
the measurement controller is configured to:
obtain information indicative of at least one of a first condition of the mobile object, and a second condition of a surrounding environment of the mobile object; and
cause the irradiation unit to irradiate the measurement region with selectively one of the first luminous pattern and the second luminous pattern in accordance with the obtained information obtained.

2. The distance measuring apparatus according to claim 1, wherein:
the predetermined measurement condition is a condition that the intensity of the return light component received by each of the pixels lies within a range from a minimum intensity to a saturation threshold intensity,
the minimum intensity being defined such that, if the intensity of the return light component received by a selected pixel in the pixels is smaller than the minimum intensity, it is difficult to obtain, based on the intensity of the return light component received by the selected pixel, an effective distance information item,
the saturation threshold intensity being defined such that, if the intensity of the return light component received by a specified pixel in the pixels is equal to or larger than the saturation threshold intensity, the specified pixel is saturated; and
the measurement controller is configured to obtain, as the effective distance information, the at least one distance value of the at least one pixel of the light receiving sensor when it is determined that the intensity of the return light component received by the at least one pixel is within the range.

3. The distance measuring apparatus according to claim 1, wherein:
the irradiation unit is configured to irradiate the measurement region with the pattern light that has a two-dimensional cross-sectional profile across an optical axis of the pattern light, the second luminous pattern being larger than the first luminous pattern on the two-dimensional cross-sectional profile.

4. The distance measuring apparatus according to claim 3, wherein:
the first luminous pattern is surrounded by the second luminous pattern on the two-dimensional cross-sectional profile.

5. The distance measuring apparatus according to claim 1, wherein:
the first light source and the second light source comprise a common chip.

6. The distance measuring apparatus according to claim 1, wherein the measurement controller is configured to perform a monitor mode that:
causes the irradiation unit not to irradiate the measurement region with the first luminous pattern and the second luminous pattern, or
causes the irradiation unit to irradiate the measurement region with only continuous light whose intensity is unmodulated as the second luminous pattern,
wherein the measurement controller is configured to obtain, based on an intensity of an ambient light component received by each of the pixels of the light receiving sensor in the monitor mode, a gray-scale image of the measurement region.

7. The distance measuring apparatus according to claim 1, wherein:
the irradiation unit is configured to irradiate the measurement region with the pattern light based on intensity-modulated light; and
the measurement controller is configured to obtain, based on a phase difference between the return light component received by each of the pixels of the light receiving sensor and the pattern light, the distance information item for the corresponding one of the pixels.

8. The distance measuring apparatus according to claim 1, wherein:
the measurement controller is configured to:
measure a time between an irradiation timing at which the pattern light is irradiated from the irradiation unit and a receiving timing at which the return light generated based on reflection of the pattern light is received by the light receiving sensor; and
obtain, based on the measured time, the distance information item for each of the pixels.

9. The distance measuring apparatus according to claim 1, wherein:
the irradiation unit is configured to irradiate the measurement region with the pattern light at a first timing as a first pattern light, and the pattern light at a second timing as a second pattern light;
the light receiving sensor is configured to:
receive, for each of the pixels, a first return light component based on reflection of the first pattern light by the target object; and
receive, for each of the pixels, a second return light component based on reflection of the second pattern light by the target object; and
the measurement controller is configured to:
obtain, based on the first return light component received by each of the pixels of the light receiving sensor, a first distance information item representing the distance value of the target object relative to the distance measuring apparatus for each of the pixels, thus obtaining a first distance information frame;
obtain, based on the second return light component received by each of the pixels of the light receiving sensor, a second distance information item representing the distance value of the target object relative to the distance measuring apparatus for each of the pixels, thus obtaining a second distance information frame; and
complement at least one distance information item included in each of the first distance information frame and the second distance information frame using at least one distance information item included in at least one of the first distance information frame and the second distance information frame, thus obtaining a corrected distance information frame,
the intensity of the return light component of the at least one pixel corresponding to the at least one distance information item included in each of the first distance information frame and the second distance information frame unsatisfying the predetermined measurement condition,
the intensity of the return light component of the at least one pixel corresponding to the at least one distance information item included in at least one of the first distance information frame and the second distance information frame satisfying the measurement condition.

10. The distance measuring apparatus according to claim 1, wherein:
the distance information items for all the pixels include a first distance information item corresponding to the return light component based on the first luminous pattern, and a second distance information item corresponding to the return light component based on the second luminous pattern, the pixel corresponding to the first distance information item being adjacent to the pixel corresponding to the second distance information item; and
the measurement controller is configured to replace the second distance information item with the first distance information item.

11. The distance measuring apparatus according to claim 1, wherein:
a magnification of a light emission intensity of the first luminous pattern to a light emission intensity of the second luminous pattern is set to be within a range of 2 to 250 times.

12. The distance measuring apparatus according to claim 1, wherein:
the irradiation unit is configured to irradiate the measurement region with plural pattern lights as the pattern light at respective different timings;
the light receiving sensor is configured to:
receive, by the light receiving sensor, return lights, each of which is generated based on reflection of a corresponding one of the pattern lights by the target object, return light components of each of the return lights being received by the respective pixels of the light receiving sensor; and
the measurement controller is configured to:
obtain, based on the return light components of each of the return lights, a corresponding one of distance information frames, each of the distance information frames based on the corresponding one of the return lights, the distance measuring apparatus further comprising:

a recognition unit configured to recognize the target object in accordance with the distance information frames obtained by the measurement controller, the recognition unit being configured to track, among the distance information frames, at least one distance information item of the recognized target object corresponding to the first luminous pattern, thus tracking the same target object among the distance information frames.

13. A distance measuring method comprising:

irradiating a measurement region with a pattern light having a predetermined luminous pattern that is comprised of a first luminous pattern, and a second luminous pattern having a relatively low intensity lower than an intensity of the first luminous pattern;

receiving, by a light receiving sensor comprising a plurality of light receiving elements respectively corresponding to a plurality of pixels, a return light based on reflection of the pattern light by a target object located in the measurement region;

obtaining, based on a return light component received by each of the pixels of the light receiving sensor, a distance information item representing a distance value of the target object relative to the distance measuring apparatus for each of the pixels;

determining whether an intensity of each of the return light components received by the corresponding one of the pixels satisfies a predetermined measurement condition; and obtaining, as effective distance information, at least one distance value of at least one pixel of the light receiving sensor when it is determined that the intensity of the return light component received by the at least one pixel satisfies the predetermined measurement condition, wherein irradiating of the measurement region comprises at least one of:

individually irradiating the measurement region with the first luminous pattern and the second luminous pattern;

irradiating the measurement region with both the first luminous pattern and the second luminous pattern as the pattern light in a first irradiation mode;

irradiating the measurement region selectively with one of the first luminous pattern and the second luminous pattern in a second irradiation mode; and obtaining information indicative of at least one of a first condition of a mobile object on which the light receiving sensor is installed, and a second condition of a surrounding environment of the mobile object, and irradiating the measurement region with selectively one of the first luminous pattern and the second luminous pattern in accordance with the obtained information obtained.

* * * * *